US012531393B2

(12) United States Patent
Geen

(10) Patent No.: US 12,531,393 B2
(45) Date of Patent: Jan. 20, 2026

(54) POROUS DISTRIBUTED BRAGG REFLECTOR APPARATUSES, SYSTEMS, AND METHODS

(71) Applicant: IQE plc, Cardiff (GB)

(72) Inventor: Matthew Geen, Cardiff (GB)

(73) Assignee: IQE plc, Cardiff (GB)

( * ) Notice: Subject to any disclaimer, the term of this patent is extended or adjusted under 35 U.S.C. 154(b) by 694 days.

(21) Appl. No.: 17/961,079

(22) Filed: Oct. 6, 2022

(65) Prior Publication Data
US 2023/0118828 A1  Apr. 20, 2023

(30) Foreign Application Priority Data
Oct. 19, 2021 (GB) ...................................... 2114924

(51) Int. Cl.
*H01S 5/183* (2006.01)
*H01S 5/125* (2006.01)
*H01S 5/187* (2006.01)

(52) U.S. Cl.
CPC .......... *H01S 5/18361* (2013.01); *H01S 5/125* (2013.01); *H01S 5/18327* (2013.01); *H01S 5/18341* (2013.01); *H01S 5/187* (2013.01)

(58) Field of Classification Search
CPC .. H01S 5/18361; H01S 5/125; H01S 5/18327; H01S 5/18341; H01S 5/187
See application file for complete search history.

(56) References Cited

U.S. PATENT DOCUMENTS

| | | |
|---|---|---|
| 5,206,523 A | 4/1993 | Goesele et al. |
| 5,306,385 A | 4/1994 | Cho et al. |
| 5,439,843 A | 8/1995 | Sakaguchi et al. |
| 5,939,732 A | 8/1999 | Kurtz et al. |
| 6,103,590 A | 8/2000 | Swanson et al. |
| 6,107,213 A | 8/2000 | Tayanaka |
| 6,284,671 B1 | 9/2001 | Schmuki et al. |

(Continued)

FOREIGN PATENT DOCUMENTS

| | | |
|---|---|---|
| CN | 113471814 A | 10/2021 |
| EP | 0932204 A1 | 7/1999 |

(Continued)

OTHER PUBLICATIONS

Extended European Search Report in European Application No. 22201132.2, European Patent Office, Munich, mailed Apr. 20, 2023, 15 pages.

(Continued)

*Primary Examiner* — Yuanda Zhang
(74) *Attorney, Agent, or Firm* — Sterne, Kessler Goldstein & Fox P.L.L.C.

(57) ABSTRACT

A layered structure includes a first layer being a single material and a cavity coupled to the first layer. The first layer includes a porous region to form a first distributed Bragg reflector (DBR). The porous region includes alternating first porous and second porous sublayers of the single material to form the first DBR. The cavity includes an active region to generate radiation, detect radiation, or both. Advantageously, the layered structure and method of forming the layered structure improves the speed of manufacturing DBRs, reduces strain in the layered structure, reduces the size of the layered structure, and increases throughput.

14 Claims, 14 Drawing Sheets

(56) References Cited

U.S. PATENT DOCUMENTS

| | | | |
|---|---|---|---|
| 6,376,269 | B1 | 4/2002 | Chen et al. |
| 6,376,859 | B1 | 4/2002 | Swanson et al. |
| 6,549,556 | B1 | 4/2003 | Hwang et al. |
| 6,677,183 | B2 | 1/2004 | Sakaguchi et al. |
| 6,891,578 | B2 | 5/2005 | Yonehara et al. |
| 10,347,597 | B2 | 7/2019 | Kononchuk et al. |
| 11,164,740 | B2 | 11/2021 | Hurwitz et al. |
| 11,201,451 | B2 | 12/2021 | Hammond et al. |
| 11,355,340 | B2 | 6/2022 | Hammond et al. |
| 2002/0044585 | A1 | 4/2002 | Song et al. |
| 2002/0100941 | A1 | 8/2002 | Yonehara et al. |
| 2002/0163688 | A1 | 11/2002 | Zhu et al. |
| 2002/0179930 | A1 | 12/2002 | Irwin et al. |
| 2003/0081642 | A1 | 5/2003 | Hwang et al. |
| 2003/0190794 | A1 | 10/2003 | Ohmi et al. |
| 2004/0005740 | A1 | 1/2004 | Lochtefeld et al. |
| 2004/0031979 | A1 | 2/2004 | Lochtefeld et al. |
| 2004/0076209 | A1 | 4/2004 | Bour et al. |
| 2004/0233963 | A1 | 11/2004 | Hooper et al. |
| 2004/0245571 | A1 | 12/2004 | Cheng et al. |
| 2005/0121678 | A1 | 6/2005 | Ezaki et al. |
| 2005/0221591 | A1 | 10/2005 | Bedell et al. |
| 2006/0187997 | A1 | 8/2006 | Ezaki et al. |
| 2007/0013991 | A1 | 1/2007 | Kise et al. |
| 2008/0112442 | A1 | 5/2008 | Ikuta |
| 2009/0180509 | A1 | 7/2009 | Kise et al. |
| 2011/0250416 | A1 | 10/2011 | Bruel et al. |
| 2012/0055236 | A1 | 3/2012 | Takulapalli |
| 2013/0011656 | A1 | 1/2013 | Zhang et al. |
| 2013/0034117 | A1 | 2/2013 | Hibbs-Brenner et al. |
| 2013/0207237 | A1 | 8/2013 | Weisbuch et al. |
| 2013/0294038 | A1 | 11/2013 | Andru et al. |
| 2014/0003458 | A1 | 1/2014 | Han |
| 2015/0131691 | A1 | 5/2015 | Lee et al. |
| 2015/0303655 | A1 | 10/2015 | Han et al. |
| 2016/0071760 | A1 | 3/2016 | Liu |
| 2016/0153113 | A1 | 6/2016 | Zhang et al. |
| 2016/0268123 | A1 | 9/2016 | De Souza et al. |
| 2016/0372568 | A1 | 12/2016 | Posseme |
| 2017/0062284 | A1 | 3/2017 | Mason et al. |
| 2017/0093128 | A1 | 3/2017 | Fattal et al. |
| 2017/0170025 | A1 | 6/2017 | Dahal et al. |
| 2017/0221839 | A1 | 8/2017 | Kononchuk et al. |
| 2017/0237234 | A1 | 8/2017 | Han et al. |
| 2019/0068886 | A1 | 2/2019 | Baek et al. |
| 2019/0131454 | A1 | 5/2019 | Goktepeli et al. |
| 2019/0172923 | A1 | 6/2019 | Pelzel et al. |
| 2019/0181218 | A1 | 6/2019 | Goktepeli et al. |
| 2019/0221993 | A1 | 7/2019 | Hammond et al. |
| 2020/0035843 | A1 | 1/2020 | Zhao et al. |
| 2020/0119521 | A1 | 4/2020 | Feng et al. |
| 2020/0185882 | A1 | 6/2020 | Zhao et al. |
| 2021/0126161 | A1* | 4/2021 | Monavarian ........ H01S 5/18361 |
| 2021/0320214 | A1 | 10/2021 | Clark et al. |

FOREIGN PATENT DOCUMENTS

| | | |
|---|---|---|
| EP | 2641265 A1 | 9/2013 |
| GB | 2347559 A | 9/2000 |
| GB | 2592017 A | 8/2021 |
| WO | 2016054232 A1 | 4/2016 |
| WO | 2018184288 A1 | 10/2018 |
| WO | 2019145728 A1 | 8/2019 |
| WO | 2021108772 A1 | 6/2021 |
| WO | 2021148803 A1 | 7/2021 |
| WO | 2021150688 A1 | 7/2021 |

OTHER PUBLICATIONS

Elafandy et al., "GaN Blue Vertical-Cavity Surface-Emitting Lasers Using Conductive Nanoporous Distributed Bragg Reflectors," Proc. of SPIE, vol. 11706, Mar. 5, 2021, 8 pages.

Kang et al., "Development of highly reflective mirrors for III-nitrides from green to UV," Proc. of SPIE, vol. 11686, Mar. 5, 2021, 7 pages.

Rahman et al., "Tuning the Photonic Stop Bands of Nanoporous Anodic Alumina-Based Distributed Bragg Reflectors by Pore Widening," ACS Applied Materials & Interfaces, vol. 5, No. 24, pp. 13375-13381, Dec. 6, 2013, 7 pages.

Park et al., "Distributed Bragg Reflector Using Nanoporous TiO2 Thin Films," Japanese Journal of Applied Physics, vol. 50, No. 1, 012503, Jan. 1, 2011, 5 pages.

Braniste et al., "Multilayer porous structures on GaN for the fabrication of Bragg reflectors," Proc. of SPIE, vol. 10248, May 30, 2017, 7 pages.

Algun et al., "An Investigation of Electrical Properties of Porous Silicon," Istanbul University, Department of Physics, Jan. 3, 1999, pp. 789-797, 9 pages.

Anderson et al., "Investigations of the Electrical Properties of Porous Silicon," J. Electrochem. Soc., vol. 138, No. 11, Nov. 1991, pp. 3406-3411, 6 pages.

Combined Search and Examination Report in Great Britain Application No. 2114924.0, mailed Feb. 28, 2022, 11 pages.

Courte et al., "High-Temperature Characterization of Multiple Silicon-Based Substrate for RF-IC Applications," IEEE Journal of the Electron Devices Society, vol. 10, 620-626, Jul. 6, 2022, 7 pages.

Feezell et al., "InP-Based 1.3-1.6.mu.m VCSELs with selectively etched tunnel-junction apertures on a wavelength flexible platform," IEEE Photonics Technology Letters, vol. 17, No. 10, Oct. 2005, pp. 2017-2019, 3 pages.

Gautier et al., "Porous silicon for electrical isolation in radio frequency devices: A review," Applied Physics Reviews, vol. 1, 011101, 2014, 19 pages.

Hussein et al., "Effect of current density and etching time on photoluminescence and energy band gap of p-type porous silicon," Optical and Quantum Electronics Springer Germany, vol. 48, No. 3, 194, 2016, 8 pages.

Kim et al., "Strong Anisotropic Thermal Conductivity of Nanoporous Silicon, Journal of Applied Physics," vol. 118, 154304, 2015, 7 pages.

Lehmann et al., "The Physics of Macropore Formation in Low-Doped p-Type Silicon," Journal of the Electrochemical Society, vol. 146, No. 8, pp. 2968-2975, 1999, 9 pages.

Liu et al., "Microstructure and Crystallinity of Porous Silicon and Epitaxial Silicon Layers Fabricated on p.sup.+Porous Silicon," J. Vac. Sci. Techno. B, vol. 21, No. 1, Jan. 2003, 7 pages.

Lysenko et al., "Thermal Conductivity of Thick Meso-Porous Silicon Layers by Micro-Raman Scattering," Journal of Applied Physics, vol. 86, No. 12, Dec. 15, 1999, 7 pages.

Pavesi et al., "All-porous silicon-coupled microcavities: Experiment versus theory," Physical Review B, vol. 58, No. 23, Dec. 15, 1998, 7 pages.

Rack et al., "Small- and Large-Signal Performance Up to 175 of Low-Cost Porous Silicon Substrate for RF Applications," IEEE Transactions on Electron Devices, vol. 65, No. 5, May 2018, 9 pages.

Sarafis et al. "Porous Si as a Substrate for the Monolithic Integration on RF and Millimeter-Wave Passive Devices (transmission lines, inductors, filters and antennas): Current state-of-art and perspectives," Applied Physics Reviews, vol. 4, 031102, 2017, 19 pages.

Scheen et al., "Post-process porous silicon for 5G applications," Solid State Electronics, vol. 168, 107719, Nov. 26, 2019, 6 pages.

Twesten et al., "Microstructure of laterally oxidized AlxGa1-xAs layers in vertical-cavity lasers," Applied Physics Letters, vol. 69, No. 1, Jul. 1, 1996, pp. 19-21, 3 pages.

Wallner, "Porous silicon technology for integrated microsystems," PhD dissertation, Electrical and Computer Engineering Department, MTU, Houghton, MI, 2006, 155 pages.

Zhu et al., "Wafer-scale Fabrication of Non-Polar Mesoporous GaN Distributed Bragg Reflectors via Electrochemical Porosification," Nature, Scientific Reports, vol. 7, 45344, 2017, 8 pages.

* cited by examiner

POROUS DISTRIBUTED BRAGG REFLECTOR APPARATUSES, SYSTEMS, AND METHODS

CROSS REFERENCE TO RELATED APPLICATION

This application claims priority to GB Application No. 2114924.0, filed Oct. 19, 2021, which is hereby incorporated herein in its entirety by reference.

BACKGROUND

Field

The present disclosure relates to distributed Bragg reflector (DBR) apparatuses, systems, and methods, for example, apparatuses, systems, and methods for forming a vertical-cavity surface-emitting laser (VCSEL) with a porous DBR.

Background

A distributed Bragg reflector (DBR) is a reflector formed from multiple layers of alternating materials with alternating refractive indices. Planar DBR mirrors include multiple layers with alternating high- and low-refractive indices. DBRs are key components in vertical-cavity surface-emitting lasers (VCSELs) as well as other photonic, optical, and/or electronic devices.

A VCSEL is a type of semiconductor laser diode with emission perpendicular to the top and bottom surfaces. A cavity resonator for a VCSEL can be formed from an active region vertically surrounded by two DBR mirrors. Conventional VCSELs include epitaxially growing multiple alternating III-V semiconductor layers (e.g., $Al_xGa_{1-x}As/Al_yGa_{1-y}As$, $0 \leq x$, $y \leq 1$, $x \neq y$) to form a DBR due to the periodically alternating refractive indices of the layers.

However, epitaxial growth of the alternating material layers is costly and time-consuming, taking upwards of ten hours to form top and bottom DBRs from different alternating epitaxial layers using standard metal-organic chemical vapor deposition (MOCVD) or molecular-beam epitaxy (MBE) methods, making throughput and yield low. Further, epitaxial growth of different alternating multiple layers to form the DBR can introduce unwanted strain and/or defects into the layered stack. In addition, conventional epitaxial DBRs require the same wavelength(s) to pass through the entire layered stack.

SUMMARY

Accordingly, there is a need to improve the speed and efficiency of manufacturing DBRs in a layered structure for photonic, optical, and/or electronic devices, reduce induced strain and/or defects in the layered structure from the manufacturing process, reduce the overall size (e.g., thickness) of the layered structure for a more compact and simplistic design, and/or increase manufacturing throughput and yield.

In some aspects, a layered structure includes a first layer and a cavity. In some aspects, the first layer is a single material. In some aspects, the first layer includes a porous region to form a first DBR. In some aspects, the porous region includes alternating first porous and second porous sublayers of the single material to form the first DBR. In some aspects, the cavity is coupled to the first layer. In some aspects, the cavity includes an active region to generate radiation, detect radiation, or both. Advantageously, the first layer includes only a single material to form the first DBR, which improves the efficiency of manufacturing the DBR (e.g., does not require multiple epitaxial layers), reduces strain in the first layer (e.g., lattice matched), and reduces the size (e.g., thickness) of the layered structure.

In some aspects, the first layer has substantially no lattice mismatch. Advantageously, strain is reduced in the first layer since there is substantially no lattice mismatch (e.g., single material), which increases throughput and overall yield.

In some aspects, a lattice mismatch between the alternating first porous and second porous sublayers is less than 0.1%. Advantageously, strain is reduced in the porous region (i.e., the first DBR) since there is substantially no lattice mismatch (e.g., less than 0.1%), which increases throughput and overall yield.

In some aspects, the alternating first porous and second porous sublayers include alternating porous and substantially non-porous sublayers. Advantageously, DBR fabrication is faster (e.g., less than five minutes) utilizing substantially non-porous sublayers to efficiently and reproducibly form alternating sublayers of low and high indices of refraction to form the first DBR.

In some aspects, the first and second porous sublayers have the same porosity. Advantageously, strain is reduced in the porous region since there is substantially no lattice mismatch (e.g., same material). Further advantageously, DBR fabrication is faster (e.g., less than five minutes) utilizing different porosification techniques (e.g., electrolyte concentration, acid current density, acid current fluid velocity, anodization time, temperature, material doping, etc.) for the first and second porous sublayers to efficiently and reproducibly form alternating sublayers of low and high indices of refraction to form the first DBR.

In some aspects, the single material of the first layer is a dielectric. Advantageously, the first layer includes only a single material to form the first DBR (e.g., multiple material layers are not required). Further advantageously, the dielectric (e.g., oxide, nitride, oxynitride, ceramic, glass, spin-on-glass (SOG), polymer, plastic, thermoplastic, resin, laminate, etc.) can be formed by any suitable methods including vacuum deposition, thermal evaporation, arc vaporization, ion beam deposition, e-beam deposition, sputtering, laser ablation, pulsed laser deposition (PLD), physical vapor deposition (PVD), atomic layer deposition (ALD), chemical vapor deposition (CVD), plasma-enhanced CVD (PECVD), low pressure CVD (LPCVD), MOCVD, liquid source misted chemical deposition, spin-coating, epitaxy, and/or any other suitable deposition methods (e.g., epitaxy can be used but is not required).

In some aspects, the single material of the first layer is silicon (Si), germanium (Ge), silicon-germanium (SiGe), gallium arsenide (GaAs), gallium nitride (GaN), gallium phosphide (GaP), gallium antimonide (GaSb), indium phosphide (InP), indium antimonide (InSb), a Group III-V semiconductor, or sapphire. Advantageously, the first layer includes only a single material to form the first DBR (e.g., multiple material layers are not required). Further advantageously, the single material can be formed by any suitable methods including vacuum deposition, thermal evaporation, arc vaporization, ion beam deposition, e-beam deposition, sputtering, laser ablation, PLD, PVD, ALD, CVD, PECVD, LPCVD, MOCVD, liquid source misted chemical deposition, epitaxy, vapor-phase epitaxy (VPE), liquid-phase epitaxy (LPE), solid-phase epitaxy (SPE), MBE, atomic layer epitaxy (ALE), and/or any other suitable deposition methods (e.g., epitaxy can be used but is not required).

In some aspects, the first layer is a monolithic substrate. Advantageously, the first layer includes only a single (e.g., bulk) substrate to form the first DBR (e.g., multiple material layers are not required). Further advantageously, the substrate (e.g., wafer) itself can be porosified to form the first DBR within the substrate and avoid forming a separate layer and/or material to form the first DBR.

In some aspects, the layered structure further includes a second layer to form a second DBR. In some aspects, the first layer contacts a first side of the cavity and the second layer contacts a second side of the cavity. Advantageously, a resonant cavity can be formed with the first and second DBRs for tuning the intensity and/or wavelength of the radiation.

In some aspects, the second layer is a second single material. In some aspects, the second layer includes a second porous region to form the second DBR. In some aspects, the second porous region includes alternating first porous and second porous sublayers of the second single material to form the second DBR. Advantageously, the second layer includes only a single material to form the second DBR, which improves the efficiency of manufacturing the second DBR (e.g., does not require multiple epitaxial layers), reduces strain in the second layer (e.g., lattice matched), and reduces the size (e.g., thickness) of the layered structure.

In some aspects, the second layer has substantially no lattice mismatch. Advantageously, strain is reduced in the second layer since there is substantially no lattice mismatch (e.g., single material), which increases throughput and overall yield.

In some aspects, a lattice mismatch between the alternating first porous and second porous sublayers is less than 0.1%. Advantageously, strain is reduced in the porous region (i.e., the second DBR) since there is substantially no lattice mismatch (e.g., less than 0.1%), which increases throughput and overall yield.

In some aspects, the cavity includes one or more embedded contacts to apply current to the active region. Advantageously, intracavity contacts can be formed within and/or atop the cavity itself, reducing the overall size (e.g., thickness) of the layered structure. Further advantageously, the first layer and/or the second layer is not required to be doped (e.g., p-type) in order to apply a current to the active region of the cavity.

In some aspects, the layered structure forms a VCSEL, a light-emitting diode (LED), a resonant cavity LED, an optical detector, a wireless receiver, a wireless transmitter, a wireless transceiver, or a combination thereof. Advantageously, the layered structure provides a platform for a variety of photonic, optical, and/or electronic devices in a compact and simplistic design, including non-optical (e.g., wireless) radiation emission and/or detection applications.

In some aspects, a method of forming a layered structure includes forming a first layer, the first layer being a single material. In some aspects, the method further includes porosifying the first layer to form a porous region to form a first distributed Bragg reflector (DBR). In some aspects, the porous region includes alternating first porous and second porous sublayers of the single material to form the first DBR. In some aspects, the method further includes forming a cavity coupled to the first layer. In some aspects, the cavity includes an active region to generate radiation, detect radiation, or both. Advantageously, the first layer includes only a single material to form the first DBR by porosification, which improves the efficiency of manufacturing the DBR (e.g., does not require multiple epitaxial layers), allows greater freedom of the first layer material selection, reduces strain in the first layer (e.g., lattice matched), and reduces the size (e.g., thickness) of the layered structure.

In some aspects, the porosifying the first layer includes a porosification rate of at least 0.1 μm/min. Advantageously, DBR manufacturing is faster, high quality (e.g., R 90%), more efficient, and induced strain and/or defects from DBR manufacturing are reduced in the layered structure. For example, a porous DBR with a thickness of 1 μm can be manufactured in ten minutes.

In some aspects, the porosification rate is at least 1 μm/min. Advantageously, DBR manufacturing is faster, high quality (e.g., R 90%), more efficient, and induced strain and/or defects from DBR manufacturing are reduced in the layered structure. For example, a porous DBR with a thickness of 4 μm can be manufactured in four minutes.

In some aspects, the alternating first porous and second porous sublayers include alternating porous and substantially non-porous sublayers. Advantageously, DBR fabrication is faster (e.g., less than five minutes) utilizing substantially non-porous sublayers to efficiently and reproducibly form alternating sublayers of low and high indices of refraction to form the first DBR.

In some aspects, the first and second porous sublayers have the same porosity. Advantageously, strain is reduced in the porous region since there is substantially no lattice mismatch (e.g., same material). Further advantageously, DBR fabrication is faster (e.g., less than five minutes) utilizing different porosification techniques (e.g., electrolyte concentration, acid current density, acid current fluid velocity, anodization time, temperature, material doping, etc.) for the first and second porous sublayers to efficiently and reproducibly form alternating sublayers of low and high indices of refraction to form the first DBR.

In some aspects, the single material of the first layer is a dielectric. Advantageously, the first layer includes only a single material to form the first DBR (e.g., multiple material layers are not required). Further advantageously, the dielectric (e.g., oxide, nitride, oxynitride, ceramic, glass, SOG, polymer, plastic, thermoplastic, resin, laminate, etc.) can be formed by any suitable methods including vacuum deposition, thermal evaporation, arc vaporization, ion beam deposition, e-beam deposition, sputtering, laser ablation, PLD, PVD, ALD, CVD, PECVD, LPCVD, MOCVD, liquid source misted chemical deposition, spin-coating, and/or any other suitable deposition methods (e.g., epitaxy can be used but is not required).

In some aspects, the single material of the first layer is Si, Ge, SiGe, GaAs, GaN, GaP, GaSb, InP, InSb, a Group III-V semiconductor, or sapphire. Advantageously, the first layer includes only a single material to form the first DBR (e.g., multiple material layers are not required). Further advantageously, the single material can be formed by any suitable methods including vacuum deposition, thermal evaporation, arc vaporization, ion beam deposition, e-beam deposition, sputtering, laser ablation, PLD, PVD, ALD, CVD, PECVD, LPCVD, MOCVD, liquid source misted chemical deposition, epitaxy, VPE, LPE, SPE, MBE, ALE, and/or any other suitable deposition methods (e.g., epitaxy can be used but is not required).

In some aspects, the first layer is a monolithic substrate. Advantageously, the first layer includes only a single (e.g., bulk) substrate to form the first DBR (e.g., multiple material layers are not required). Further advantageously, the substrate (e.g., wafer) itself can be porosified to form the first DBR within the substrate and avoid forming a separate layer and/or material to form the first DBR.

In some aspects, the method further includes forming a second layer to form a second DBR. In some aspects, the first layer contacts a first side of the cavity and the second layer contacts a second side of the cavity. Advantageously, a resonant cavity can be formed with the first and second DBRs for tuning the intensity and/or wavelength of the radiation.

In some aspects, the second layer is a second single material. In some aspects, the method further includes porosifying the second layer to form a second porous region to form the second DBR. In some aspects, the second porous region includes alternating first porous and second porous sublayers of the second single material to form the second DBR. Advantageously, the second layer includes only a single material to form the second DBR, which improves the efficiency of manufacturing the second DBR (e.g., does not require multiple epitaxial layers), reduces strain in the second layer (e.g., lattice matched), and reduces the size (e.g., thickness) of the layered structure.

In some aspects, the method further includes forming one or more embedded contacts within the cavity to apply current to the active region. Advantageously, intracavity contacts can be formed within and/or atop the cavity itself, reducing the overall size (e.g., thickness) of the layered structure. Further advantageously, the first layer and/or the second layer is not required to be doped (e.g., p-type) in order to apply a current to the active region of the cavity.

In some aspects, the method further includes forming a VCSEL, LED, a resonant cavity LED, an optical detector, a wireless receiver, a wireless transmitter, a wireless transceiver, or a combination thereof with the layered structure. Advantageously, the layered structure provides a platform for a variety of photonic, optical, and/or electronic devices in a compact and simplistic design, including non-optical (e.g., wireless) radiation emission and/or detection applications.

In some aspects, the first DBR is fabricated in less than ten minutes. Advantageously, DBR manufacturing is faster, high quality (e.g., R 90%), more efficient, and reduces induced strain and/or defects in the layered structure. For example, the first DBR with a thickness of 10 micron can be manufactured in less than ten minutes (e.g., porosification rate of 1 μm/min).

In some aspects, the first DBR is fabricated in less than five minutes. Advantageously, DBR manufacturing is faster, high quality (e.g., R 90%), more efficient, and reduces induced strain and/or defects in the layered structure. For example, the first DBR with a thickness of 7.5 μm can be manufactured in less than five minutes (e.g., porosification rate of 1.5 μm/min).

In some aspects, the first DBR is fabricated in less than two minutes. Advantageously, DBR manufacturing is faster, high quality (e.g., R 90%), more efficient, and reduces induced strain and/or defects in the layered structure. For example, the first DBR with a thickness of 5 μm can be manufactured in less than two minutes (e.g., porosification rate of 2.5 μm/min).

In some aspects, the cavity is an electromagnetic (EM) cavity to generate EM radiation, detect EM radiation, or both. Advantageously, the layered structure provides a platform for a variety of photonic, optical, and/or electronic devices in a compact and simplistic design, including non-optical (e.g., wireless) radiation emission and/or detection applications with the EM cavity.

In some aspects, the EM radiation includes RF radiation. Advantageously, the layered structure provides RF radiation (e.g., about 20 kHz to about 300 GHz) emission, detection, or both for wireless applications (e.g., WiFi, Bluetooth, RF receiver, RF transmitter, RF transceiver, etc.). For example, the EM cavity can include a planar antenna having a resonance of about 1 GHz to detect incident RF radiation and/or emit RF radiation. Further advantageously, the layered structure provides bandwidth and/or frequency filtering of RF signals. For example, the layered structure can include one or more DBR layers having a thickness of about 1 cm to about 10 cm to filter wavelengths of about 1 mm to about 10 mm.

In some aspects, the EM radiation includes microwave radiation. Advantageously, the layered structure provides microwave radiation (e.g., about 300 MHz to about 300 GHz) emission, detection, or both for telecommunication applications (e.g., radar, satellite, wireless, networks, etc.). For example, the EM cavity can include a planar antenna having a resonance of about 100 GHz to detect incident microwave radiation and/or emit microwave radiation. Further advantageously, the layered structure provides bandwidth and/or frequency filtering of microwave signals. For example, the layered structure can include one or more DBR layers having a thickness of about 1 mm to about 1 cm to filter wavelengths of about 100 μm to about 1 mm.

In some aspects, the EM radiation includes IR, VIS, and/or UV radiation. Advantageously, the layered structure provides IR-VIS-UV radiation (e.g., about 10 nm to about 1 mm) emission, detection, or both for optical applications (e.g., VCSELs, LEDs, lasers, detectors, photodiodes, short-range wireless, spectroscopy, etc.). For example, the EM cavity can include an active region (e.g., quantum well) having a response between about 1 μm to about 10 μm to detect incident IR radiation and/or emit IR radiation. For example, the EM cavity can include an active region (e.g., quantum well) having a response between about 400 nm to about 700 nm to detect incident VIS radiation and/or emit VIS radiation. Further advantageously, the layered structure provides bandwidth and/or wavelength filtering of optical signals. For example, the layered structure can include one or more DBR layers having a thickness of about 10 μm to about 100 μm to filter wavelengths of about 1 μm to about 10 μm. For example, the layered structure can include one or more DBR layers having a thickness of about 5 μm to filter wavelengths of about 500 nm.

In some aspects, the cavity is an acoustic cavity to generate acoustic radiation, detect acoustic radiation, or both. Advantageously, the layered structure provides acoustic radiation (e.g., about 1 Hz to about 10 GHz) emission, detection, or both for acoustic and sensing applications (e.g., ultrasound, non-contact sensor, telecommunication, imaging, etc.). For example, the acoustic cavity can include a planar acoustic membrane (e.g., microelectromechanical system (MEMS) oscillator, MEMS microphone, surface acoustic wave (SAW) sensor, etc.) having a response between about 100 MHz to 10 GHz to detect incident acoustic radiation and/or emit acoustic radiation. Further advantageously, the layered structure provides bandwidth and/or frequency filtering of acoustic signals. For example, the layered structure can include one or more DBR layers having a thickness of about 3 cm to filter acoustic radiation of about 1 GHz.

In some aspects, a layered structure includes: a first layer being a single material and including a porous region to form a first DBR, the porous region including alternating porous and substantially non-porous sublayers of the single material to form the first DBR; a second layer opposite the first layer, the second layer to form a second DBR; and an optical cavity between the first layer and the second layer, the optical cavity including an active region to generate light, detect light, or both. Advantageously, the first layer includes only a single material to form the first DBR, which improves the efficiency of manufacturing the DBR (e.g., does not require multiple epitaxial layers), reduces strain in the first layer (e.g., lattice matched), and reduces the size (e.g., thickness) of the layered structure.

In some aspects, a thickness of the first layer is less than a thickness of the second layer. Advantageously, the first layer reduces the size (e.g., thickness) of the layered structure.

In some aspects, the first layer is a monolithic substrate. Advantageously, the first layer includes only a single (e.g., bulk) substrate to form the first DBR (e.g., multiple material layers are not required). Further advantageously, the substrate (e.g., wafer) itself can be porosified to form the first DBR within the substrate and avoid forming a separate layer and/or material to form the first DBR.

In some aspects, the second layer is a second single material and includes a second porous region to form the second DBR, the second porous region including alternating porous and substantially non-porous sublayers of the second single material to form the second DBR. Advantageously, a resonant optical cavity can be formed with the first and second DBRs for tuning the intensity and/or wavelength of the light.

In some aspects, the layered structure forms a VCSEL, an LED, an optical detector, or a combination thereof. Advantageously, the layered structure provides a platform for a variety of photonic, optical, and/or optoelectronic devices in a compact and simplistic design.

In some aspects, a method of forming a layered structure includes: forming a first layer, the first layer being a single material; porosifying the first layer to form a porous region to form a first DBR, the porous region including alternating porous and substantially non-porous sublayers of the single material to form the first DBR; forming a second layer opposite the first layer, the second layer to form a second DBR; and forming an optical cavity between the first layer and the second layer, the optical cavity including an active region to generate light, detect light, or both. Advantageously, the first layer includes only a single material to form the first DBR by porosification, which improves the efficiency of manufacturing the DBR (e.g., does not require multiple epitaxial layers), allows greater freedom of the first layer material selection, reduces strain in the first layer (e.g., lattice matched), and reduces the size (e.g., thickness) of the layered structure.

Implementations of any of the techniques described above can include a system, a method, a process, a device, and/or an apparatus. The details of one or more implementations are set forth in the accompanying drawings and the description below. Other features will be apparent from the description and drawings, and from the claims.

Further features and exemplary aspects of the aspects, as well as the structure and operation of various aspects, are described in detail below with reference to the accompanying drawings. It is noted that the aspects are not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the aspects and, together with the description, further serve to explain the principles of the aspects and to enable a person skilled in the relevant art(s) to make and use the aspects.

Figure 1:
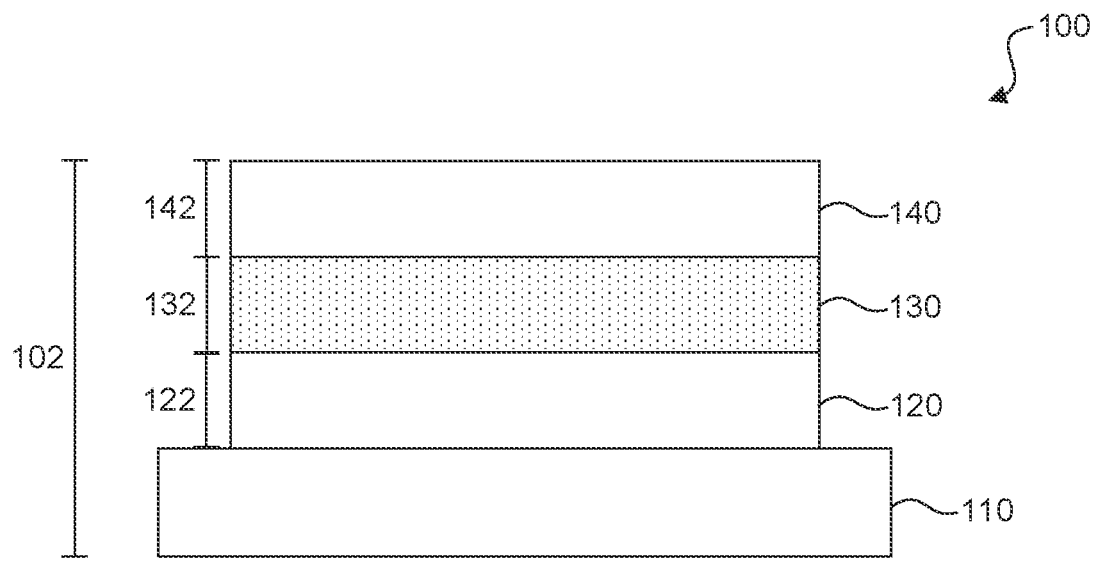
FIG. 1 is a schematic cross-sectional illustration of a layered structure, according to an exemplary aspect.

The features and exemplary aspects of the aspects will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more aspects that incorporate the features of this present invention. The disclosed aspect(s) merely exemplify the present invention. The scope of the invention is not limited to the disclosed aspect(s). The present invention is defined by the claims appended hereto.

The aspect(s) described, and references in the specification to "one aspect," "an aspect," "an example aspect," "an exemplary aspect," etc., indicate that the aspect(s) described can include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is understood that it is within the knowledge of one skilled in the art to effect such feature, structure, or characteristic in connection with other aspects whether or not explicitly described.

Spatially relative terms, such as "beneath," "below," "lower," "above," "on," "upper" and the like, can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein can likewise be interpreted accordingly.

The term "about" or "substantially" or "approximately" as used herein means the value of a given quantity that can vary based on a particular technology. Based on the particular technology, the term "about" or "substantially" or "approximately" can indicate a value of a given quantity that varies within, for example, 0.1-10% of the value (e.g., ±0.1%, ±1%, ±2%, ±5%, or ±10% of the value).

The term "radiation" as used herein means electromagnetic radiation or acoustic radiation. Electromagnetic radiation includes radio frequency (RF), microwave, infrared (IR), visible (VIS), ultraviolet (UV), x-rays, and gamma radiation. Acoustic radiation includes ultrasound or sound waves.

The term "epitaxy" or "epitaxial" as used herein means crystalline growth of material, for example, via high temperature deposition. Epitaxy can be effected in a MBE tool in which layers are grown on a heated substrate in an ultra-high vacuum environment. Elemental sources are heated in a furnace and directed towards the substrate without carrier gases. The elemental constituents react at the substrate surface to create a deposited layer. Each layer is allowed to reach its lowest energy state before the next layer is grown so that bonds are formed between the layers.

Epitaxy can also be performed in a metal-organic vapor phase epitaxy (MOVPE) tool, also known as a MOCVD tool. Compound metal-organic and hydride sources are flowed over a heated surface using a carrier gas, for example, hydrogen. Epitaxial deposition in the MOCVD tool occurs at much higher pressures than in an MBE tool. The compound constituents are broken in the gas phase and then reacted at the surface to grow layers of desired composition.

The term "substrate" as used herein means a planar wafer on which subsequent layers may be deposited, formed, or grown. A substrate may be formed of a single element (e.g., Si) or a compound material (e.g., GaAs), and may be doped or undoped. In some aspects, for example, a substrate can include Si, Ge, SiGe, silicon-germanium tin (SiGeSn), GaAs, GaN, GaP, GaSb, InP, InSb, a Group IV semiconductor, a Group III-V semiconductor, a Group II-VI semiconductor, graphene, silicon carbide (SiC), or sapphire.

A substrate may be on-axis, that is where the growth surface aligns with a crystal plane. For example, a substrate can have <100> crystal orientation. Reference herein to a substrate in a given crystal orientation also encompass a substrate which is miscut by up to 20° towards another crystallographic direction. For example, a (100) substrate miscut towards the (111) plane.

The term "monolithic" as used herein means a layer or substrate comprising bulk (e.g., single) material throughout. Alternatively, the layer or substrate may be porous for some or all of its thickness.

The term "compound material" or "Group III-V semiconductor" as used herein means comprising one or more materials from Group III of the periodic table (e.g., group 13 elements: boron (B), aluminum (Al), gallium (Ga), indium (In), thallium (Tl)) with one or more materials from Group V of the periodic table (e.g., group 15 elements: nitrogen (N), phosphorus (P), arsenic (As), antimony (Sb), bismuth (Bi)). The compounds have a 1:1 combination of Group III and Group V regardless of the number of elements from each group. Subscripts in chemical symbols of compounds refer to the proportion of that element within that group. For example, $Al_{0.25}GaAs$ means the Group III part comprises 25% Al, and thus 75% Ga, while the Group V part comprises 100% As.

The term "Group IV semiconductor" as used herein indicates comprising one or more materials from Group IV of the periodic table (e.g., group 14 elements: carbon (C), silicon (Si), germanium (Ge), tin (Sn), lead (Pb)).

The term "Group II-VI semiconductor" as used herein indicates comprising one or more materials from Group II of the periodic table (e.g., group 12 elements: zinc (Zn), cadmium (Cd), mercury (Hg)) with one or more materials from Group VI of the periodic table (e.g., group 16 elements: oxygen (O), sulfur (S), selenium (Se), tellurium (Te)).

The term "distributed Bragg reflector layer" or "DBR layer" as used herein means a layer or material that includes alternating refractive indices and can operate as a reflector. A DBR layer may be formed of a single element (e.g., Si) or a compound material (e.g., GaAs). In some aspects, for example, a DBR layer can include Si, Ge, SiGe, SiGeSn, GaAs, GaN, GaP, GaSb, InP, InSb, a Group IV semiconductor, a Group III-V semiconductor, a Group II-VI semiconductor, graphene, SiC, or sapphire.

The term "reflectivity" or "reflectance" or "R" as used herein means the effectiveness of a surface to reflect radiation. Reflectivity (R) can be described as a percentage (e.g., R=95%), for example, R=100% means complete reflection of incident radiation and R=0% means no reflection (e.g., absorption) of incident radiation.

The term "cavity" as used herein means a layer or material that includes an active region configured to generate and/or detect radiation. A cavity may be formed of a single element (e.g., Si), a compound material (e.g., GaAs), or several different materials (e.g., GaInAsSb/AlGaAsSb) to form one or more quantum wells or quantum dots. In some aspects, for example, a cavity can include Si, Ge, SiGe, SiGeSn, GaAs, GaN, GaP, GaSb, InP, InSb, a Group IV semiconductor, a Group III-V semiconductor, a Group II-VI semiconductor, graphene, SiC, or sapphire.

The term "intracavity" as used herein means a layer or material formed within the cavity (e.g., doping), atop the cavity, below the cavity, or within the layered structure to form one or more electrical contacts to the active region of the cavity.

The term "dielectric" as used herein means a layer or material that is electrically insulating. In some aspects, for example, dielectric can include oxide, nitride, oxynitride, ceramic, glass, spin-on-glass (SOG), polymer, plastic, thermoplastic, resin, laminate, high-k dielectric, and/or any other electrically insulating material.

The term "doping" or "doped" as used herein means that a layer or material contains a small impurity concentration of another element (dopant) which donates (donor) or extracts (acceptor) charge carriers from the parent material and therefore alters the conductivity. Charge carriers may be electrons or holes. A doped material with extra electrons is called n-type while a doped material with extra holes (fewer electrons) is called p-type.

The term "crystalline" as used herein means a material or layer with a single crystal orientation. In epitaxial growth or deposition, subsequent layers with the same or similar lattice constant follow the registry of the previous crystalline layer and therefore grow with the same crystal orientation or crystallinity. As will be understood by a person of ordinary skill in the art, crystal orientation, for example, <100> means the face of cubic crystal structure and encompasses [100], [010], and [001] orientations using the Miller indices. Similarly, for example, <0001> encompasses [0001] and [000-1], except if the material polarity is critical. Also, integer multiples of any one or more of the indices are equivalent to the unitary version of the index. For example, (222) is equivalent to (111).

The term "lattice matched" as used herein means that two crystalline layers have the same, or similar, lattice spacing such that the second layer will tend to grow isomorphically (e.g., same crystalline form) on the first layer.

The term "lattice constant" as used herein means the unstrained lattice spacing of the crystalline unit cell.

The term "lattice coincident" as used herein means that a crystalline layer has a lattice constant which is, or is close to, an integer multiple of the previous layer so that the atoms can be in registry with the previous layer.

The term "lattice mismatch" as used herein means the lattice constants of two adjacent layers are neither lattice matched nor lattice coincident. Lattice mismatch introduces elastic strain into the layered structure, for example, the second layer, as the second layer adopts the in-plane lattice spacing of the first layer. The strain is compressive where the second layer has a larger lattice constant and tensile where the second layer has a smaller lattice constant.

Where the strain is too great, the layered structure relaxes to minimize energy through defect generation, for example, dislocations, known as slip, or additional interstitial bonds, each of which allows the layer to revert towards its lattice constant. The strain may be too great due to a large lattice mismatch or due to an accumulation of small mismatches over many layers.

Lattice mismatch ($\Delta a$) between multiple layers can lead to increased strain in the layered structure. Lattice mismatch ($\Delta a$) can be normalized (e.g., $\Delta a/a$) and expressed as a percentage (%). The mismatch in lattice structures between any two layers (e.g., material 1 and material 2) induces a strain between the two layers. Lattice strain induced by a second layer over a first layer is represented as a product of the lattice mismatch between the first and second layers and the second layer thickness: strain=$\Delta a \cdot t_2$.

Further, a first layer (e.g., material 1) atop a substrate and a second layer (e.g., material 2) atop the first layer are strain balanced with respect to the substrate if:

$$(\Delta a_1 \cdot t_1) = (\Delta a_2 \cdot t_2)$$

where $\Delta a_1$ is the lattice mismatch of material 1 to the substrate, $t_1$ is the thickness of the first layer, $\Delta a_2$ is the lattice mismatch of material 2 to the substrate, and $t_2$ is the thickness of the second layer. This is further described in U.S. Pat. No. 10,332,857, which is incorporated by reference herein in its entirety.

The term "substantially no lattice mismatch" as used herein means a lattice mismatch of less than 10% (e.g., $\Delta a \leq 10\%$).

The term "deposition" as used herein means the depositing of a layer on another layer or substrate. Deposition encompasses epitaxy, PVD, CVD, powder bed deposition, and/or other known techniques to deposit material in a layer.

The term "lateral" or "in-plane" as used herein means parallel to the surface of the substrate and perpendicular to the growth direction.

The term "vertical" or "out-of-plane" as used herein means perpendicular to the surface of the substrate and in the growth direction.

The term "porous region" as used herein means a layer that includes air or vacuum pores, with the porosity defined as the proportion of the area which is occupied by the pores rather than the bulk (e.g., single) material (e.g., a percentage %). The porosity can vary through the thickness of the layer. For example, the layer may be porous in one or more sublayers. The layer may include an upper portion which is porous and a lower portion that is non-porous. The porosity may be constant or variable within the porous region. Where the porosity is variable, the porosity may be linearly varied through the thickness, or may be varied according to a different function, for example, quadratic, logarithmic, or a step function.

Alternatively, the layer may include one or more discrete, non-continuous portions (domains) that are porous with the remainder being non-porous (e.g., with bulk material properties). The portions may be non-continuous within the plane of a sublayer and/or through the thickness of the layer (e.g., horizontally and/or vertically with respect to the growth direction). The portions may be distributed in a regular array or irregular pattern across the layer and/or through the layer.

The term "substantially non-porous" as used herein means a layer with bulk material properties having a low porosity (e.g., less than 35%) and long-range crystallinity. For example, a substantially non-porous layer is relatively crystalline and long-range crystallinity of the layer is not significantly affected by a porosification process. A substantially non-porous layer contains at least some porosity in order for an acid current (e.g., electrolyte) to pass through the substantially non-porous layer to a lower layer or sublayer located below the substantially non-porous layer.

The term "porosifying" or "porosification" as used herein means forming a porous region with a particular porosity in a layer or substrate. The porosity of a material is affected by electrolyte concentration, acid current density, acid current fluid velocity, anodization time, temperature, and/or material doping. Porosifying can include electrochemical (EC) etching or photoelectrochemical (PEC) etching to form one or more porous sublayers in a layer or substrate. For example, an acid current (e.g., hydrofluoric acid (HF) at 100 mA/cm$^2$ and 20° C.) can be periodically applied to a layer to form alternating first porous and second porous layers. This is further described in U.S. Publication No. 2019/0221993, which is incorporated by reference herein in its entirety.

The index of refraction (n) deceases with increasing porosity. The index of refraction determines how much the path of light is bent or refracted when entering the material and how fast light travels through the material (e.g., n=c/v, where c is the speed of light, 3×10$^8$ m/s). The refractive index of a porous material is based on the porosity and the refractive index of the non-porous base material. Increasing the porosity in a material can decrease the refractive index since the pores allow light to travel faster than in the base material (e.g., the empty pores approximate that of air (n≈1) or vacuum (n=1)).

For example, different alternating first porous and second porous sublayers can be formed by periodically changing an acid current (e.g., high porosity, low porosity, high porosity, etc.) such that the sublayers have alternating different indices of refraction (e.g., low-refractive index, high-refractive index, low-refractive index, etc.) to form a DBR. In another example, different alternating porous and substantially non-porous sublayers can be formed by periodically changing the acid current (e.g., first porosity, low porosity, first porosity, etc.) such that the sublayers have alternating different indices of refraction (e.g., low-refractive index, high-refractive index, low-refractive index, etc.) to form a DBR.

The term "porosification rate" as used herein means a rate of forming or etching a porous region in a layer. For example, a porosification rate of 1 µm/min forms a porous region (e.g., alternating first porous and second porous sublayers) having 1 micron thickness in 1 minute.

Numerical values, including endpoints of ranges, can be expressed herein as approximations preceded by the term "about," "substantially," "approximately," or the like. In such cases, other aspects include the particular numerical values. Regardless of whether a numerical value is expressed as an approximation, two aspects are included in this disclosure: one expressed as an approximation, and another not expressed as an approximation. It will be further understood that an endpoint of each range is significant both in relation to another endpoint, and independently of another endpoint.

Aspects of the disclosure can be implemented in hardware, firmware, software, or any combination thereof. Aspects of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions can be described herein as performing certain actions. However, it should be appreciated that such descriptions are merely for convenience and that such actions in fact result from computing devices, processors, controllers, or other devices executing the firmware, software, routines, instructions, etc.

Exemplary Layered Structure Apparatuses

As discussed above, a DBR is a reflector formed from multiple layers of alternating materials with alternating refractive indices (n). Planar DBR mirrors include multiple layers (e.g., pairs) with alternating high- and low-refractive indices. Each layer boundary causes a partial reflection of a wave (e.g., optical wave) and the partial reflections can constructively interfere to act as a high-quality reflector (e.g., reflectivity R≥90%) for a range of wavelengths. Increasing the number of pairs in a DBR increases the reflectivity (R), and increasing the refractive index contrast (Δn) increases both the reflectivity and bandwidth. DBRs are key components in VCSELs as well as other photonic, optical, and/or electronic devices (e.g., LEDs, RF switches) since DBRs can be used to form a cavity resonator (e.g., optical cavity).

A VCSEL is a type of semiconductor laser diode with emission perpendicular to the top and bottom surfaces. A cavity resonator (e.g., optical cavity) for a VCSEL can include an active region (e.g., one or more quantum wells or quantum dots) between two DBRs. Conventional VCSELs utilize multiple alternating Group III-V semiconductor layers (e.g., $Al_xGa_{1-x}As/Al_yGa_{1-y}As$, 0≤x, y≤1, x≠y) that are epitaxially grown to form a DBR due to the periodically alternating refractive indices of the layers.

However, epitaxial growth of the alternating material layers is costly and time-consuming, taking upwards of 10 hours using standard MOCVD or MBE methods, which reduces throughput and yield. Further, epitaxial growth of multiple layers to form the DBR can introduce unwanted strain and/or defects into the layered stack. In addition, previous epitaxial DBRs require the same wavelength(s) to pass through the entire layered stack.

Aspects of porous DBR apparatuses, systems, and methods as discussed below can improve the speed and efficiency of manufacturing DBRs in a layered structure for photonic, optical, and/or electronic devices, reduce induced strain and/or defects in the layered structure from the manufacturing process, reduce the overall size (e.g., thickness) of the layered structure for a more compact and simplistic design, and increase manufacturing throughput and yield.

FIG. 1 illustrates a conventional layered structure 100, according to an exemplary aspect. As shown in FIG. 1, layered structure 100 can have thickness 102 and include substrate 110, first epitaxial DBR layer 120, optical cavity 130, and second epitaxial DBR layer 140. Layered structure 100 can be configured to form a VCSEL or other optical device. Thickness 102 is about 300 µm to about 700 µm. In some aspects, substrate 110 can be doped (e.g., n-type, n+) to provide current to optical cavity 130 and/or act as a platform for growing first epitaxial DBR layer 120.

First epitaxial DBR layer 120 is configured to form a bottom DBR in layered structure 100. First epitaxial DBR layer 120 is formed from multiple alternating epitaxial layers (e.g., AlGaAs/AlGaAs, GaSb/AlAsSb, or the like) of alternating refractive indices by MOCVD or MBE methods and has thickness 122. Thickness 122 is about 3 µm to about 6 µm. First epitaxial DBR layer 120 takes about two hours to about five hours to form using MOCVD or MBE methods. In some aspects, first epitaxial DBR layer 120 can be a planar DBR mirror with alternating epitaxial layers of high- and low-refractive indices. In some aspects, first epitaxial DBR layer 120 can be doped (e.g., n-type, n+) to act as a contact to provide current to optical cavity 130.

Optical cavity 130 is configured to generate light in layered structure 100. Optical cavity 130 can include one or more quantum wells or quantum dots to generate laser light in between and has thickness 132. Thickness 132 is about 500 nm to about 2 µm. In some aspects, optical cavity 130 can generate light wavelengths of about 650 nm to about 1300 nm.

Second epitaxial DBR layer 140 is configured to form a top DBR in layered structure 100. Similar to first epitaxial DBR layer 120, second epitaxial DBR layer 140 is also formed from multiple alternating epitaxial layers (e.g., AlGaAs/AlGaAs, GaSb/AlAsSb, or the like) of alternating refractive indices by MOCVD or MBE methods and has thickness 142. Thickness 142 is about 3 µm to about 6 µm. Second epitaxial DBR layer 140 takes about two hours to about five hours to form using MOCVD or MBE methods. In some aspects, second epitaxial DBR layer 140 can be a planar DBR mirror with alternating epitaxial layers of high- and low-refractive indices. In some aspects, second epitaxial DBR layer 140 can be doped (e.g., p-type, p+) to provide current to optical cavity 130. In some aspects, second epitaxial DBR layer 140 can have the same materials in the multiple alternating epitaxial layers as in first epitaxial DBR layer 120.

As discussed above, layered structure 100 is conventional and is costly and time-consuming to manufacture, taking upwards of ten hours or more to manufacture using standard MOCVD and MBE methods. Further, first and second epitaxial DBR layers 120, 140 introduce unwanted strain and/or defects into layered structure 100 due to the numerous alternating epitaxial layers. Additionally, layered structure 100 is limited to outputting the same wavelength(s) through the entire stack (e.g., from substrate 110 to second epitaxial DBR layer 140).

FIGS. 2-6 illustrate layered structures 200, 300, 400, 400', 600, according to various exemplary aspects. Although layered structure 200, 300, 400, 400', 600 is shown in FIGS. 2-6, respectively, as a stand-alone apparatus and/or system, the aspects of this disclosure can be used with other apparatuses, systems, and/or methods.

Figure 2:
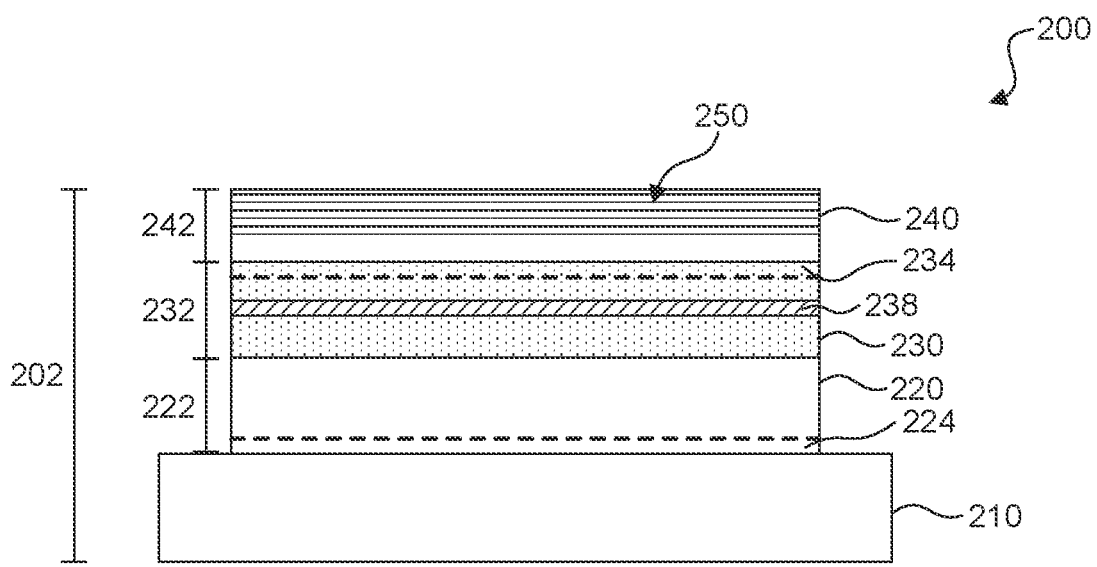
FIG. 2 is a schematic cross-sectional illustration of a layered structure, according to an exemplary aspect.

As shown in FIG. 2, layered structure 200 can have thickness 202 and include substrate 210, second DBR layer 220, cavity 230, and first DBR layer 240. Layered structure 200 can be configured to include a porous DBR (e.g., first DBR layer 240) fabricated from a single material for faster manufacturing and reduced strain. Layered structure 200 can be further configured to form various photonic, optical, and/or electronic devices (e.g., VCSEL, LED, resonant cavity LED, optical detector, photodiode, wireless receiver, wireless transmitter, wireless transceiver, etc.). Thickness 202 is about 50 μm to about 250 μm. In some aspects, substrate 210 can include a dielectric, a semiconductor, a compound semiconductor, and/or any other suitable material. In some aspects, substrate 210 can be monolithic. In some aspects, substrate 210 can be doped (e.g., n-type, n+) to provide current to cavity 230 and/or act as a platform for forming second DBR layer 220. In some aspects, as shown in FIG. 2, second DBR layer 220 can contact a bottom side of cavity 230 and first DBR layer 240 can contact a top side of cavity 230. In some aspects, layered structure 200 forms a VCSEL, an LED, a resonant cavity LED, an optical detector, a wireless receiver, a wireless transmitter, a wireless transceiver, or a combination thereof.

Second DBR layer 220 is configured to form a bottom DBR in layered structure 200. Similar to first epitaxial DBR layer 120, second DBR layer 220 can be formed from multiple alternating epitaxial layers (e.g., AlGaAs/AlGaAs, GaSb/AlAsSb, or the like) of alternating refractive indices by MOCVD or MBE methods and has thickness 222. Thickness 222 is about 3 μm to about 6 μm. In some aspects, second DBR layer 220 can be a planar DBR mirror with alternating epitaxial layers of high- and low-refractive indices. In some aspects, second DBR layer 220 can be doped (e.g., n-type, n+, n++) to act as a contact to provide current to cavity 230. For example, as shown in FIG. 2, second DBR layer 220 can include bottom contact 224 that is highly doped (e.g., n++). In some aspects, second DBR layer 220 can include an external conductive contact to provide current to cavity 230. For example, as shown in FIG. 2, bottom contact 224 can include a conductive layer (e.g., metal, metal-oxide, etc.).

Cavity 230 can include active region 238 and has thickness 232. Active region 238 is configured to generate and/or detect radiation in layered structure 200. Thickness 232 is about 500 nm to about 2 μm. In some aspects, active region 238 can include one or more quantum wells or quantum dots to generate radiation in between. In some aspects, active region 238 can generate wavelengths of about 10 nm to about 1 mm. In some aspects, active region 238 can include a planar circuit and/or conductive pattern (e.g., transducer, antenna, transmitter, transceiver, etc.) to generate and/or detect radiation (e.g., EM radiation, acoustic radiation, etc.). For example, active region 238 can generate and/or detect wireless, RF, microwave, and/or acoustic radiation. In some aspects, cavity 230 can include an embedded contact (e.g., p-type, p+, p++, tunnel junction, buried tunnel junction (BTJ), etc.) to provide current to active region 238. For example, as shown in FIG. 2, cavity 230 can include top contact 234 (intracavity) that is highly doped (e.g., n++). In some aspects, layered structure 200 can include an external conductive top contact (e.g., metal, metal-oxide, etc.) to provide current to cavity 230.

Figure 8:
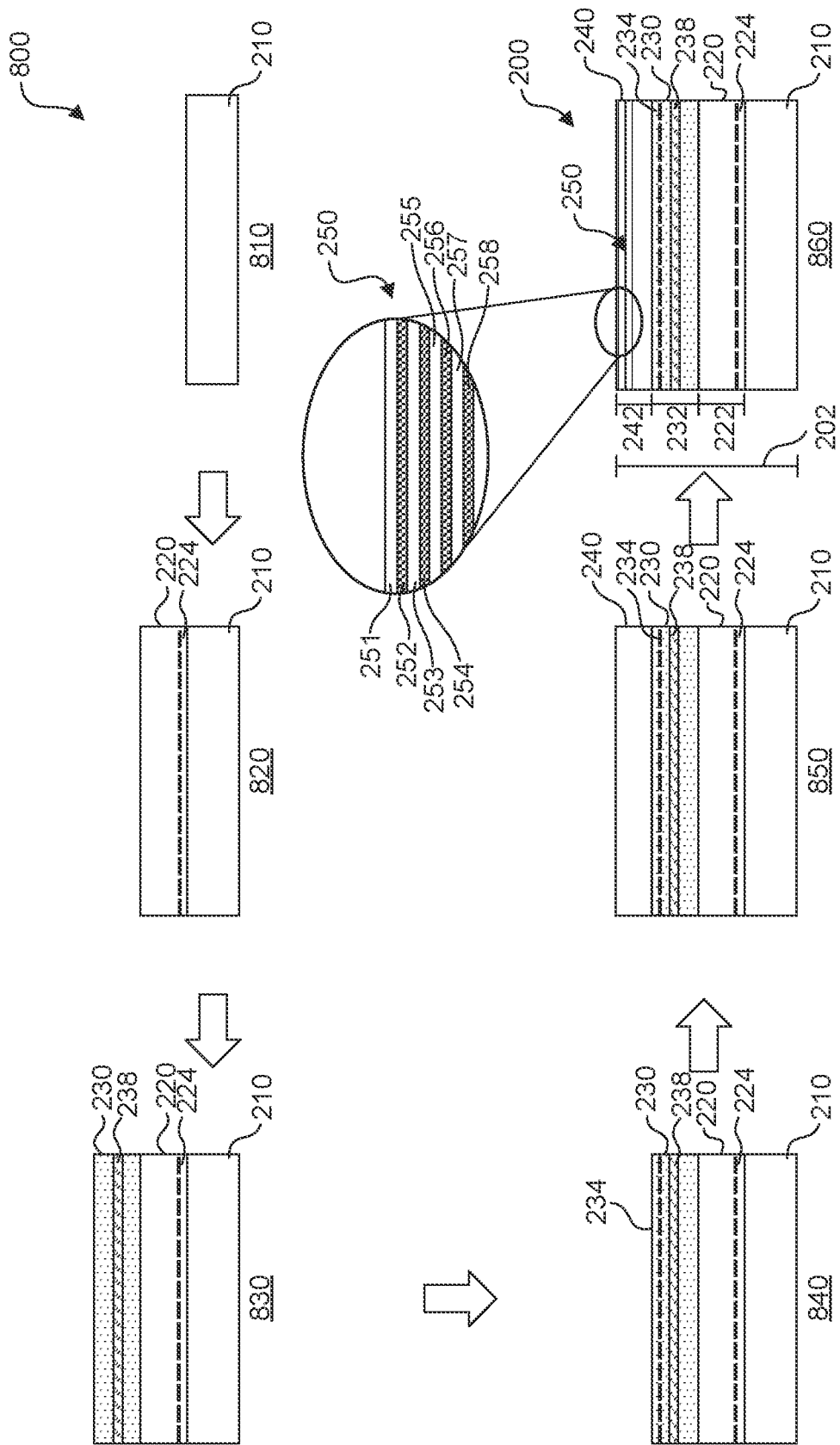
FIG. 8 is a schematic manufacturing diagram for forming the layered structure shown in FIG. 2, according to an exemplary aspect.

First DBR layer 240 is configured to form a top porous DBR in layered structure 200. First DBR layer 240 is formed from a single material (e.g., dielectric, semiconductor, compound semiconductor, bulk material, etc.) and includes porous region 250 and has thickness 242. Thickness 242 is about 1 μm to about 50 μm. In some aspects, thickness 242 of first DBR layer 240 is less than thickness 222 of second DBR layer 220. Porous region 250 is formed by porosifying the single material. Porous region 250 includes alternating first and second porous sublayers 251-258 (shown in FIG. 8) of alternating refractive indices. In some aspects, first DBR layer 240 can be a planar DBR mirror with alternating layers of high- and low-refractive indices. For example, as shown in FIGS. 2 and 8, alternating first and second porous sublayers 251-258 can have alternating layers of high- and low-refractive indices. In some aspects, first DBR layer 240 can be doped (e.g., p-type, p+) to provide current to cavity 230.

In some aspects, first DBR layer 240 can have substantially no lattice mismatch. For example, first DBR layer 240 can have a lattice mismatch of less than 10% since first DBR layer 240 is a single material. In some aspects, a lattice mismatch between alternating first and second porous sublayers 251-258 can be less than 0.1%. For example, alternating first and second porous sublayers 251-258 can have a lattice mismatch of less than 0.1% since they are formed from the same single material. In some aspects, alternating first and second porous sublayers 251-258 can have first and second porosities, respectively. For example, alternating first and second porous sublayers 251-258 (e.g., high porosity, low porosity, high porosity, etc.) can form alternating sublayers of low and high indices of refraction. In some aspects, alternating first and second porous sublayers 251-258 can be alternating porous and substantially non-porous sublayers. For example, alternating first and second porous sublayers 251-258 (e.g., high porosity, low porosity, high porosity, etc.) can form alternating sublayers of low and high indices of refraction. In some aspects, alternating first and second porous sublayers 251-258 can have the same porosity. For example, alternating first and second porous sublayers 251-258 with the same porosity can form alternating sublayers of low and high indices of refraction by utilizing different porosification techniques for each porous sublayer (e.g., by varying the electrolyte concentration, acid current density, acid current fluid velocity, anodization time, temperature, and/or material doping).

In some aspects, the single material of first DBR layer 240 can be a dielectric. For example, the dielectric can be an oxide, nitride, oxynitride, ceramic, glass, SOG, polymer, plastic, thermoplastic, resin, laminate, or a combination thereof. In some aspects, the single material of first DBR layer 240 can be a semiconductor, a compound semiconductor, a bulk material, and/or any other suitable material. For example, the single material can be Si, Ge, SiGe, SiGeSn, GaAs, GaN, GaP, GaSb, InP, InSb, a Group III-V semiconductor, or sapphire.

Figure 3:
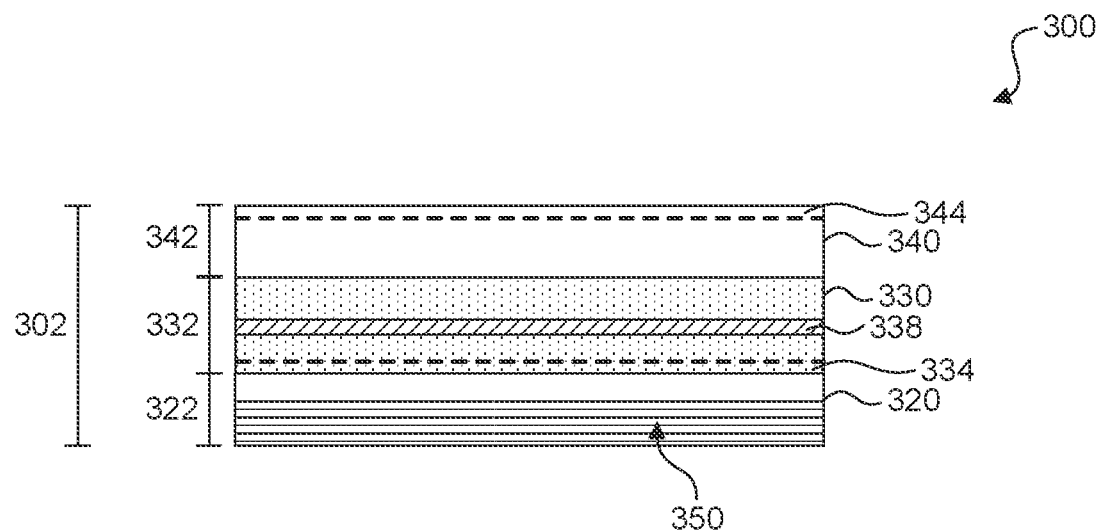
FIG. 3 is a schematic cross-sectional illustration of a layered structure, according to an exemplary aspect.
Figure 9:
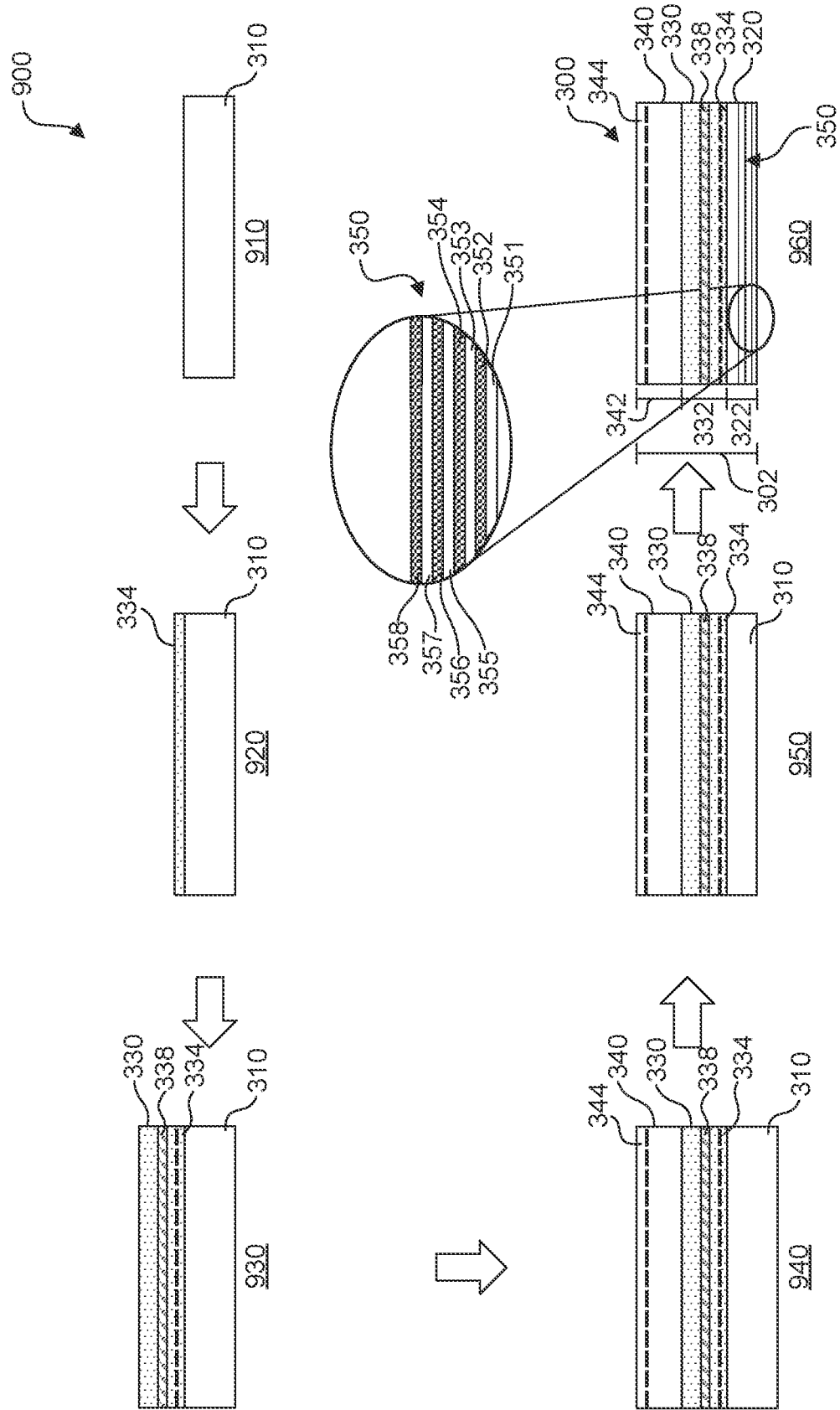
FIG. 9 is a schematic manufacturing diagram for forming the layered structure shown in FIG. 3, according to an exemplary aspect.

As shown in FIG. 3, layered structure 300 can have thickness 302 and include second DBR layer 340, cavity 330, and first DBR layer 320. Layered structure 300 can be configured to include a porous DBR (e.g., first DBR layer 320) fabricated from a single material for faster manufacturing and reduced strain. Layered structure 300 can be further configured to form various photonic, optical, and/or electronic devices (e.g., VCSEL, LED, resonant cavity LED, optical detector, photodiode, wireless receiver, wireless transmitter, wireless transceiver, etc.). Thickness 302 is about 50 μm to about 250 μm. In some aspects, first DBR layer 320 can be formed from a substrate (e.g., wafer). For example, as shown in FIG. 9, first DBR layer 320 can be formed from substrate 310 that can include a dielectric, a semiconductor, a compound semiconductor, and/or any other suitable material. In some aspects, substrate 310 can be monolithic. In some aspects, substrate 310 can be doped (e.g., n-type, n+) to provide current to cavity 330 and/or act as a platform for forming first DBR layer 320. In some aspects, as shown in FIG. 3, first DBR layer 320 can contact a bottom side of cavity 330 and second DBR layer 340 can contact a top side of cavity 330. In some aspects, layered structure 300 forms a VCSEL, an LED, a resonant cavity LED, an optical detector, a wireless receiver, a wireless transmitter, a wireless transceiver, or a combination thereof.

Second DBR layer 340 is configured to form a top DBR in layered structure 300. Similar to second DBR layer 220 shown in FIG. 2, second DBR layer 340 can be formed from multiple alternating epitaxial layers (e.g., AlGaAs/AlGaAs, GaSb/AlAsSb, or the like) of alternating refractive indices by MOCVD or MBE methods and has thickness 342. Thickness 342 is about 3 μm to about 6 μm. In some aspects, second DBR layer 340 can be a planar DBR mirror with alternating epitaxial layers of high- and low-refractive indices. In some aspects, second DBR layer 340 can be doped (e.g., p-type, p+, p++) to act as a contact to provide current to cavity 330. For example, as shown in FIG. 3, second DBR layer 340 can include top contact 344 that is highly doped (e.g., p++). In some aspects, second DBR layer 340 can include an external conductive contact to provide current to cavity 330. For example, as shown in FIG. 3, top contact 344 can include a conductive layer (e.g., metal, metal-oxide, etc.).

Cavity 330 can include active region 338 and has thickness 332. Active region 338 is configured to generate and/or detect radiation in layered structure 300. The aspects of cavity 230 shown in FIG. 2, for example, and the aspects of cavity 330 shown in FIG. 3 may be similar. Similar reference numbers are used to indicate features of the aspects of cavity 230 shown in FIG. 2 and the similar features of the aspects of cavity 330 shown in FIG. 3. In some aspects, cavity 330 can include an embedded contact (e.g., n-type, n+, n++, tunnel junction, BTJ, etc.) to provide current to active region 338. For example, as shown in FIG. 3, cavity 330 can include bottom contact 334 (intracavity) that is highly doped (e.g., n++). In some aspects, layered structure 300 can include an external conductive bottom contact (e.g., metal, metal-oxide, etc.) to provide current to cavity 330.

First DBR layer 320 is configured to form a bottom porous DBR in layered structure 300. First DBR layer 320 is formed from a single material (e.g., dielectric, semiconductor, compound semiconductor, bulk material, etc.) and includes porous region 350 and has thickness 322. Thickness 322 is about 1 μm to about 50 μm. In some aspects, thickness 322 of first DBR layer 320 is less than thickness 342 of second DBR layer 340. Porous region 350 is formed by porosifying the single material (e.g., substrate 310 shown in FIG. 9). Porous region 350 includes alternating first and second porous sublayers 351-358 (shown in FIG. 9) of alternating refractive indices. In some aspects, first DBR layer 320 can be a planar DBR mirror with alternating layers of high- and low-refractive indices. For example, as shown in FIGS. 3 and 9, alternating first and second porous sublayers 351-358 can have alternating layers of high- and low-refractive indices. In some aspects, first DBR layer 320 can be doped (e.g., n-type, n+) to provide current to cavity 330.

The aspects of first DBR layer 240 shown in FIG. 2, for example, and the aspects of first DBR layer 320 shown in FIG. 3 may be similar. Similar reference numbers are used to indicate features of the aspects of first DBR layer 240 shown in FIG. 2 and the similar features of the aspects of first DBR layer 320 shown in FIG. 3.

Figure 4:
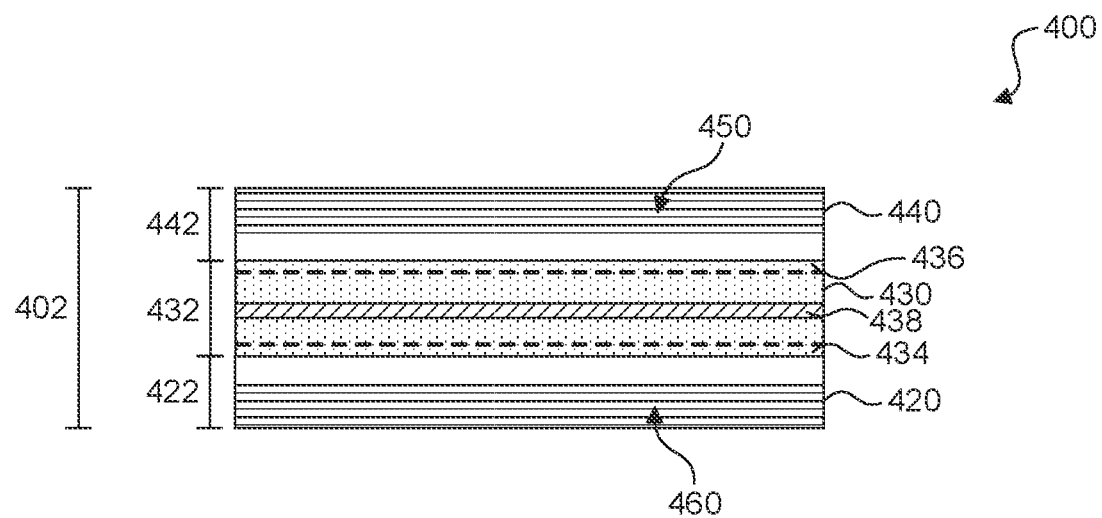
FIG. 4 is a schematic cross-sectional illustration of a layered structure, according to an exemplary aspect.
Figure 10:
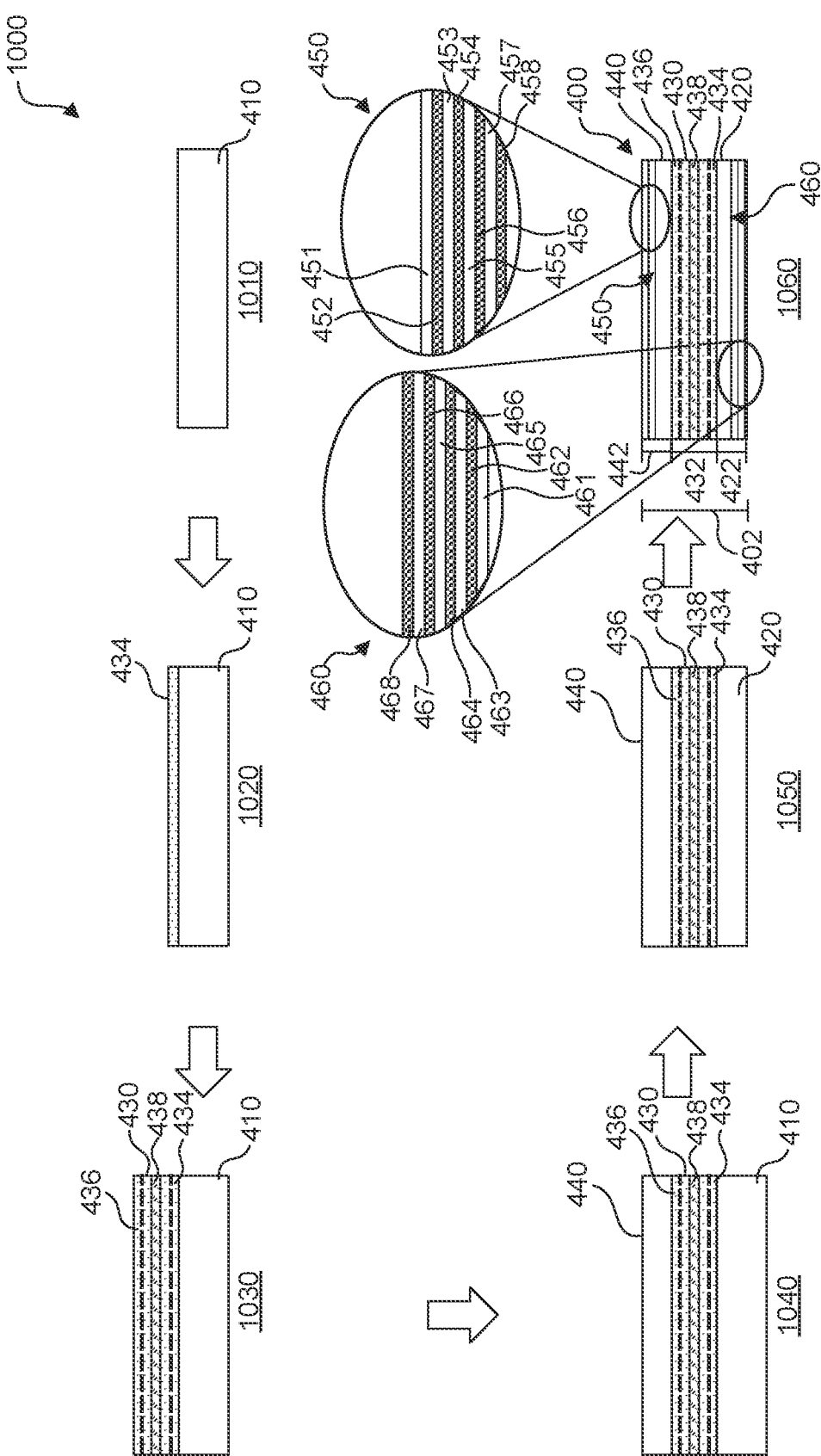
FIG. 10 is a schematic manufacturing diagram for forming the layered structure shown in FIG. 4, according to an exemplary aspect.

As shown in FIG. 4, layered structure 400 can have thickness 402 and include second DBR layer 440, cavity 430, and first DBR layer 420. Layered structure 400 can be configured to include two (2) porous DBRs (e.g., second DBR layer 440 and first DBR layer 420) each fabricated from a single material for faster manufacturing and reduced strain. Layered structure 400 can be further configured to form various photonic, optical, and/or electronic devices (e.g., VCSEL, LED, resonant cavity LED, optical detector, photodiode, wireless receiver, wireless transmitter, wireless transceiver, etc.). Thickness 402 is about 25 μm to about 100 μm. In some aspects, first DBR layer 420 can be formed from a substrate (e.g., wafer). For example, as shown in FIG. 10, first DBR layer 420 can be formed from substrate 410 that can include a dielectric, a semiconductor, a compound semiconductor, and/or any other suitable material. In some aspects, substrate 410 can be monolithic. In some aspects, substrate 410 can be doped (e.g., n-type, n+) to provide current to cavity 430 and/or act as a platform for forming first DBR layer 420. In some aspects, as shown in FIG. 4, first DBR layer 420 can contact a bottom side of cavity 430 and second DBR layer 440 can contact a top side of cavity 430. In some aspects, layered structure 400 forms a VCSEL, an LED, a resonant cavity LED, an optical detector, a wireless receiver, a wireless transmitter, a wireless transceiver, or a combination thereof.

Second DBR layer 440 is configured to form a top porous DBR in layered structure 400. Second DBR layer 440 is formed from a single material (e.g., dielectric, semiconductor, compound semiconductor, bulk material, etc.) and includes porous region 450 and has thickness 442. Thickness 442 is about 1 μm to about 50 μm. Porous region 450 is formed by porosifying the single material. Porous region 450 includes alternating first and second porous sublayers 451-458 (shown in FIG. 10) of alternating refractive indices. In some aspects, second DBR layer 440 can be a planar DBR mirror with alternating layers of high- and low-refractive indices. For example, as shown in FIGS. 4 and 10, alternating first and second porous sublayers 451-458 can have alternating layers of high- and low-refractive indices. In some aspects, second DBR layer 440 can be doped (e.g., p-type, p+) to provide current to cavity 430.

The aspects of first DBR layer 240 shown in FIG. 2, for example, and the aspects of second DBR layer 440 shown in FIG. 4 may be similar. Similar reference numbers are used to indicate features of the aspects of first DBR layer 240 shown in FIG. 2 and the similar features of the aspects of second DBR layer 440 shown in FIG. 4.

Cavity 430 can include active region 438 and has thickness 432. Active region 438 is configured to generate and/or detect radiation in layered structure 400. The aspects of cavity 230 shown in FIG. 2 and cavity 330 shown in FIG. 3, for example, and the aspects of cavity 430 shown in FIG. 4 may be similar. Similar reference numbers are used to indicate features of the aspects of cavity 230 shown in FIG. 2 and cavity 330 shown in FIG. 3 and the similar features of the aspects of cavity 430 shown in FIG. 4. In some aspects, cavity 430 can include one or more embedded contacts (e.g., n-type, n+, n++, p-type, p+, p++, tunnel junction, BTJ, etc.) to provide current to active region 438. For example, as shown in FIG. 4, cavity 330 can include bottom contact 434 (intracavity) that is highly doped (e.g., n++) and top contact 436 (intracavity) that is highly doped (e.g., p++). In some aspects, layered structure 400 can include an external conductive bottom contact (e.g., metal, metal-oxide, etc.) and an external conductive top contact (e.g., metal, metal-oxide, etc.) to provide current to cavity 430. For example, as shown in FIG. 5, layered structure 400' with thickness 402' can include bottom contact 434' (e.g., n+ doped, metal, etc.) and top contact 436' (e.g., p+ doped, metal, etc.).

First DBR layer 420 is configured to form a bottom porous DBR in layered structure 400. First DBR layer 420 is formed from a single material (e.g., dielectric, semiconductor, compound semiconductor, bulk material, etc.) and includes porous region 460 and has thickness 422. Thickness 422 is about 1 µm to about 50 µm. Porous region 460 is formed by porosifying the single material (e.g., substrate 410 shown in FIG. 10). Porous region 460 includes alternating first and second porous sublayers 461-468 (shown in FIG. 10) of alternating refractive indices. In some aspects, first DBR layer 420 can be a planar DBR mirror with alternating layers of high- and low-refractive indices. For example, as shown in FIGS. 4 and 10, alternating first and second porous sublayers 461-468 can have alternating layers of high- and low-refractive indices. In some aspects, first DBR layer 420 can be doped (e.g., n-type, n+) to provide current to cavity 430.

The aspects of first DBR layer 320 shown in FIG. 3, for example, and the aspects of first DBR layer 420 shown in FIG. 4 may be similar. Similar reference numbers are used to indicate features of the aspects of first DBR layer 320 shown in FIG. 3 and the similar features of the aspects of first DBR layer 420 shown in FIG. 4.

Figure 5:
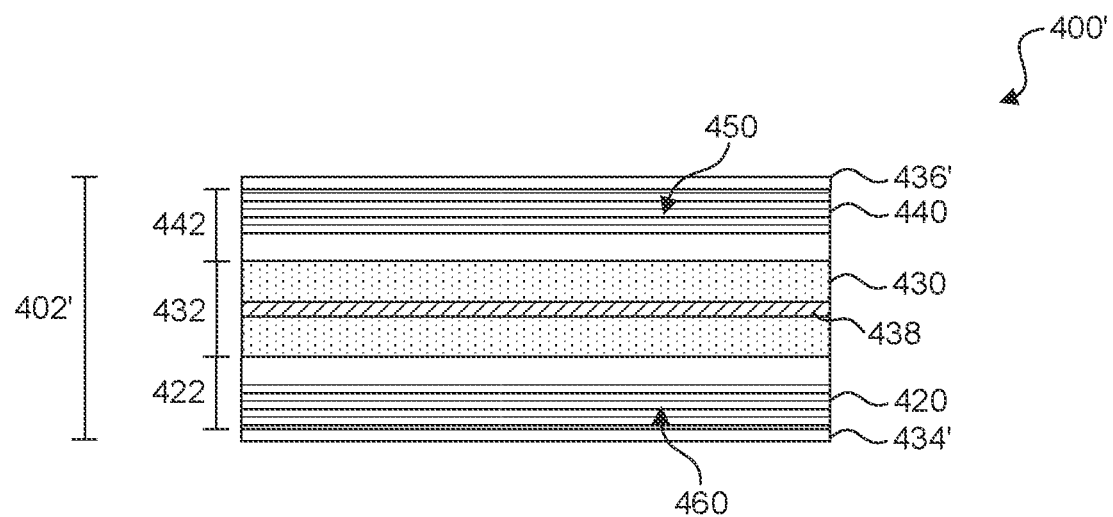
FIG. 5 is a schematic cross-sectional illustration of a layered structure, according to an exemplary aspect.

As shown in FIG. 5, layered structure 400' can have thickness 402' and include second DBR layer 440, cavity 430, and first DBR layer 420. The aspects of layered structure 400 shown in FIG. 4, for example, and the aspects of layered structure 400' shown in FIG. 5 may be similar. Similar reference numbers are used to indicate features of the aspects of layered structure 400 shown in FIG. 4 and the similar features of the aspects of layered structure 400' shown in FIG. 5. Layered structure 400' includes external bottom contact 434' (e.g., n+ doped, metal, etc.) and top contact 436' (e.g., p+ doped, metal, etc.) rather than intracavity bottom and top contacts 434, 436 as in layered structure 400 shown in FIG. 4.

Figure 6:
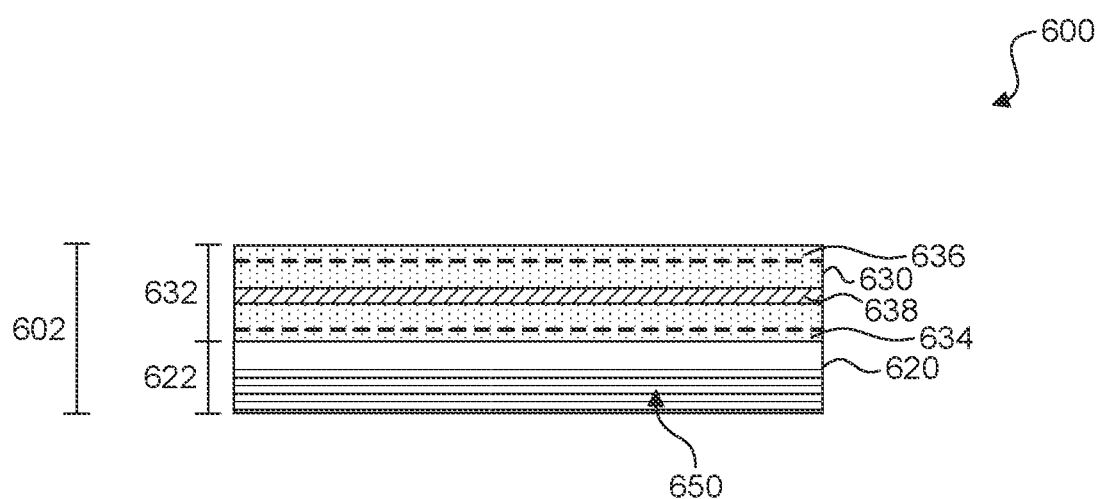
FIG. 6 is a schematic cross-sectional illustration of a layered structure, according to an exemplary aspect.
Figure 12:
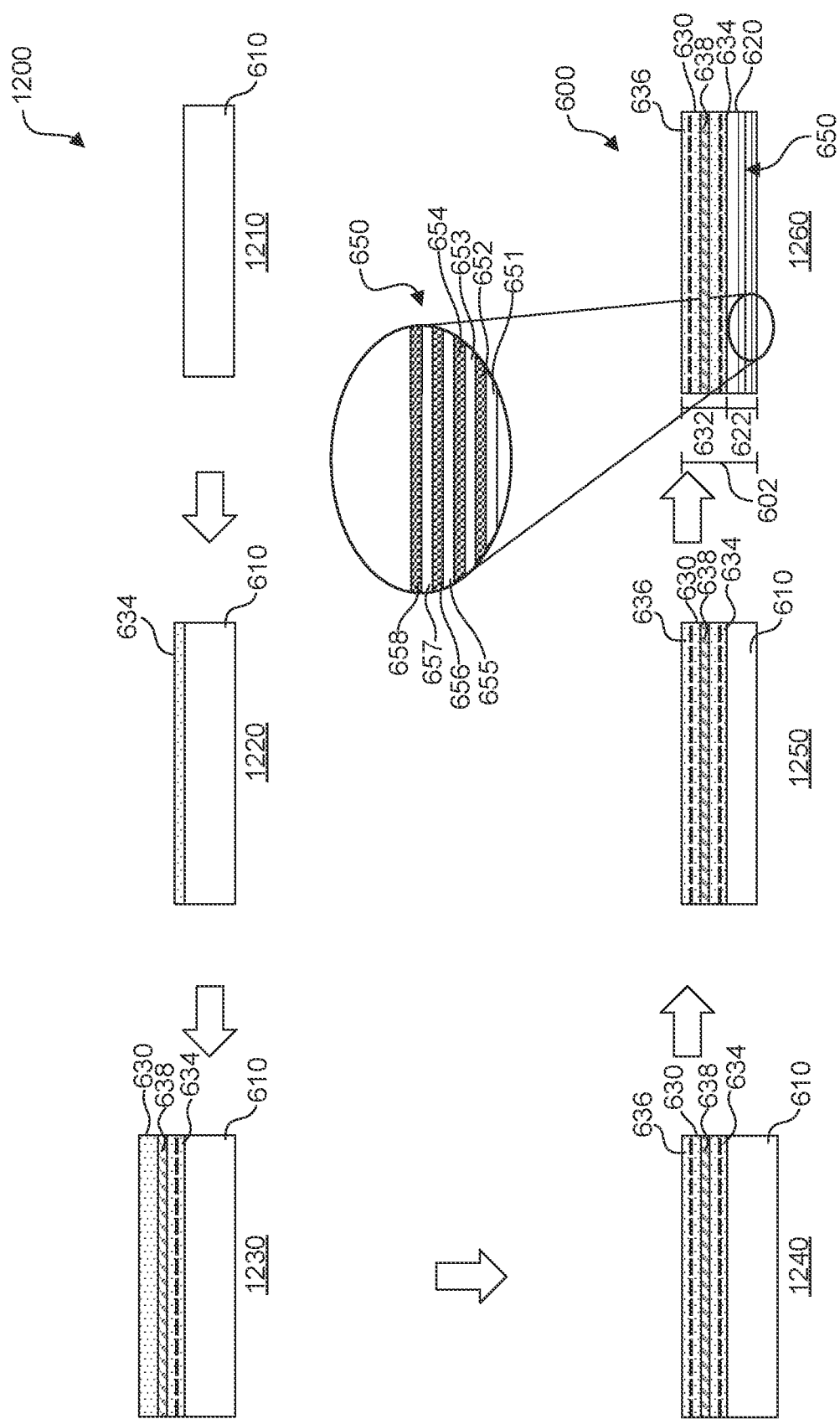
FIG. 12 is a schematic manufacturing diagram for forming the layered structure shown in FIG. 6, according to an exemplary aspect.

As shown in FIG. 6, layered structure 600 can have thickness 602 and include DBR layer 620 and cavity 630. Layered structure 600 can be configured to include a porous DBRs (e.g., DBR layer 620) fabricated from a single material for faster manufacturing and reduced strain and an exposed cavity 630. Layered structure 600 can be further configured to form various photonic, optical, and/or electronic devices (e.g., VCSEL, LED, resonant cavity LED, optical detector, photodiode, wireless receiver, wireless transmitter, wireless transceiver, etc.). Thickness 602 is about 15 µm to about 75 µm. In some aspects, DBR layer 620 can be formed from a substrate (e.g., wafer). For example, as shown in FIG. 12, DBR layer 620 can be formed from substrate 610 that can include a dielectric, a semiconductor, a compound semiconductor, and/or any other suitable material. In some aspects, substrate 610 can be monolithic. In some aspects, substrate 610 can be doped (e.g., n-type, n+) to provide current to cavity 630 and/or act as a platform for forming DBR layer 620. In some aspects, as shown in FIG. 6, DBR layer 620 can contact a bottom side of cavity 630 and a top side of cavity 630 can be exposed. In some aspects, layered structure 600 forms a VCSEL, an LED, a resonant cavity LED, an optical detector, a wireless receiver, a wireless transmitter, a wireless transceiver, or a combination thereof.

Cavity 630 can include active region 638 and has thickness 632. Active region 638 is configured to generate and/or detect radiation in layered structure 600. The aspects of cavity 430 shown in FIG. 4, for example, and the aspects of cavity 630 shown in FIG. 6 may be similar. Similar reference numbers are used to indicate features of the aspects of cavity 430 shown in FIG. 4 and the similar features of the aspects of cavity 630 shown in FIG. 6. In some aspects, cavity 630 can include one or more embedded contacts (e.g., n-type, n+, n++, p-type, p+, p++, tunnel junction, BTJ, etc.) to provide current to active region 638. For example, as shown in FIG. 6, cavity 630 can include bottom contact 634 (intracavity) that is highly doped (e.g., n++) and top contact 636 (intracavity) that is highly doped (e.g., p++). In some aspects, layered structure 600 can include a lens and/or a filter on a top side of cavity 630.

DBR layer 620 is configured to form a bottom porous DBR in layered structure 600. DBR layer 620 is formed from a single material (e.g., dielectric, semiconductor, compound semiconductor, bulk material, etc.) and includes porous region 650 and has thickness 622. Thickness 622 is about 1 µm to about 50 µm. Porous region 650 is formed by porosifying the single material (e.g., substrate 610 shown in FIG. 12). Porous region 650 includes alternating first and second porous sublayers 651-658 (shown in FIG. 12) of alternating refractive indices. In some aspects, DBR layer 620 can be a planar DBR mirror with alternating layers of high- and low-refractive indices. For example, as shown in FIGS. 6 and 12, alternating first and second porous sublayers 651-658 can have alternating layers of high- and low-refractive indices. In some aspects, DBR layer 620 can be doped (e.g., n-type, n+) to provide current to cavity 630.

The aspects of first DBR layer 420 shown in FIG. 4, for example, and the aspects of DBR layer 620 shown in FIG. 6 may be similar. Similar reference numbers are used to indicate features of the aspects of first DBR layer 420 shown in FIG. 4 and the similar features of the aspects of DBR layer 620 shown in FIG. 6.

Exemplary Porosification System

Figure 7:
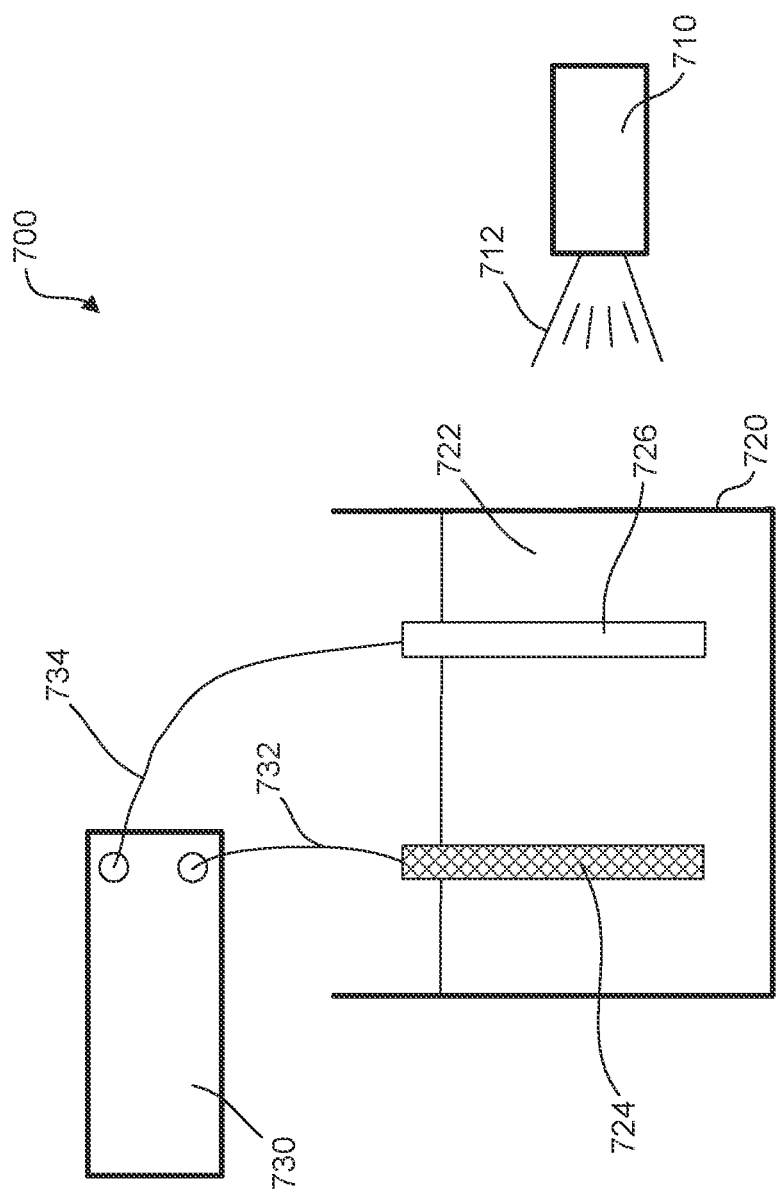
FIG. 7 is a schematic cross-sectional illustration of a porosification system, according to an exemplary aspect.

FIG. 7 illustrates porosification system 700, according to an exemplary aspect. Although porosification system 700 is shown in FIG. 7 as a stand-alone apparatus and/or system, the aspects of this disclosure can be used with other apparatuses, systems, and/or methods, for example, layered structures 200, 300, 300', 400, 400', 600, manufacturing diagrams 800, 900, 1000, 1100, 1200, and/or flow diagrams 1300, 1400, 1500, 1600, 1700.

As shown in FIG. 7, porosification system 700 can include illumination source 710, bath 720, and current source 730. Porosification system 700 can be configured to porosify or form a porous region within a layer or substrate (e.g., layered structures 200, 300, 300', 400, 400', 600). Porosification system 700 can be further configured to form one or more porous sublayers in a layer or substrate (e.g., layered structures 200, 300, 300', 400, 400', 600). Porosification system 700 can be further configured to conduct EC etching, PEC etching, or a combination thereof to porosify the layer or substrate. In some aspects, a portion of a layer or substrate (e.g., in-plane or out-of-plane) can be exposed to an acid current such that the portion is etched and a porous region remains. In some aspects, a porosity of the porous region can be controlled by adjusting electrolyte concentration, acid current density, acid current fluid velocity, anodization time, temperature, material doping, illumination power, and/or illumination wavelength.

Illumination source 710 is configured to supplement EC etching of a layer or substrate (e.g., layered structure 726) in bath 720 with PEC etching to form a porous region in the layer or substrate. PEC etching is dopant and bandgap selective and creates holes at the surface of the layer or substrate. Illumination source 710 can include a UV source (e.g., mercury lamp, arc lamp, etc.) and generate PEC illumination 712 over a portion or all of the layer or substrate. In some aspects, illumination source 710 can be a pulsed light source or include a mechanical modulator (e.g., chopper), an acousto-optical modulator (AOM), or an electro-optical modulator (EOM) to generate pulsed illumination having a particular frequency. In some aspects, illumination source 710 can have a power of about 1 mW to 10 W. In some aspects, illumination source 710 can include an optical filter to apply a particular wavelength(s) to the layer or substrate. In some aspects, illumination source 710 can be omitted for pure EC etching.

Bath 720 is configured to provide EC etching (e.g., chemical etch) of a layer or substrate (e.g., layered structure 726) to form a porous region in the layer or substrate. Bath 720 can include electrolyte 722, electrode 724, and layered structure 726 (e.g., layered structures 200, 300, 300', 400, 400', 600). In some aspects, electrolyte 722 can include any material (e.g., acid, oxidizer, etc.) to facilitate EC etching of layered structure 726. For example, electrolyte 722 can include hydrofluoric (HF) acid, hydrochloric (HCl) acid, hydrobromic (HBr) acid, sulfuric acid ($H_2SO_4$), nitric acid ($HNO_3$), oxalic acid ($C_2H_2O_4$), hydrogen peroxide ($H_2O_2$), or any other suitable acid or oxidizer. Electrode 724 can include any suitable conductor (e.g., metal, copper (Cu), aluminum (Al), platinum (Pt), etc.). In some aspects, bath 720 can maintain a temperature of about 20° C. to about 60° C. In some aspects, layered structure 726 can include layered structures 200, 300, 300', 400, 400', 600 or a portion (e.g., layer) of layered structures 200, 300, 300', 400, 400', 600).

Current source 730 is configured to provide EC etching (e.g., current etch) of a layer or substrate (e.g., layered structure 726) to form a porous region in the layer or substrate. Current source 730 can include cathode 732 and anode 734. When combined, current source 730 and bath 720 form an acid current. As shown in FIG. 7, cathode 732 can be connected to electrode 724 and anode 734 can be connected to layered structure 726 to complete the circuit. When current is applied, layered structure 726 is etched (e.g., porosified), with or without illumination source 710, and current flow is away from layered structure 726 towards electrode 724. Electrons resonate at pore tips in layered structure 726 and porosity extends through layered structure 726. In some aspects, the acid current density is about 1 $mA/cm^2$ to about 350 $mA/cm^2$. For example, the acid current density can be about 10 $mA/cm^2$ to about 100 $mA/cm^2$. The lattice parameter of the starting material (e.g., layered structure 726) remains relatively unchanged following the porosification process. In some aspects, a porosification rate in layered structure 726 can be about 1 nm/min to about 25 μm/min. For example, the porosification rate can be about 0.1 μm/min to about 5 μm/min.

Exemplary Manufacturing Diagrams

FIGS. 8-12 illustrate manufacturing diagrams 800, 900, 1000, 1100, 1200 for forming layered structures 200, 300, 300', 400, 400', 600, according to various exemplary aspects. It is to be appreciated that not all steps in FIGS. 8-12 are needed to perform the disclosure provided herein. Further, some of the steps can be performed simultaneously, sequentially, and/or in a different order than shown in FIGS. 8-12. Manufacturing diagrams 800, 900, 1000, 1100, 1200 shall be described with reference to FIGS. 1-7. However, manufacturing diagrams 800, 900, 1000, 1100, 1200 are not limited to those example aspects.

As shown in FIG. 8, manufacturing diagram 800 is configured to form layered structure 200 shown in FIG. 2. In step 810, substrate 210 is selected. In step 820, second DBR layer 220 is formed (e.g., deposited) atop substrate 210. In some aspects, bottom contact 224 can be formed (e.g., doped n++) during step 820. In step 830, cavity 230 is formed (e.g., deposited) atop second DBR layer 220. In step 840, top contact 234 is formed (e.g., doped p++) within cavity 230 (intracavity) or atop cavity 230 (intracavity) as a separate external conductive contact. In step 850, first DBR layer 240 is formed (e.g., deposited) with a single material atop cavity 230. In step 860, first DBR layer 240 is porosified (e.g., with porosification system 700 shown in FIG. 7) to form porous region 250 with alternating first and second porous sublayers 251-258 to form a top porous DBR and layered structure 200 as shown in FIG. 2.

As shown in FIG. 9, manufacturing diagram 900 is configured to form layered structure 300 shown in FIG. 3. In step 910, substrate 310 is selected from a single material (e.g., bulk material). In step 920, bottom contact 334 is formed (e.g., doped n++) as part of cavity 330 (intracavity) or atop substrate 310 (intracavity) as a separate external conductive contact. In step 930, cavity 330 is formed (e.g., deposited) atop substrate 310 and bottom contact 334. In step 940, second DBR layer 340 is formed (e.g., deposited) atop cavity 330. In step 950, substrate 310 is thinned. In some aspects, step 950 can be omitted and substrate 310 can be porosified without being thinned. In some aspects, substrate 310 can be thinned by etching, polishing, grinding, chemical-mechanical polishing (CMP), or other suitable material reducing process. In step 960, thinned substrate 310 (e.g., first DBR layer 320) is porosified (e.g., with porosification system 700 shown in FIG. 7) to form porous region 350 with alternating first and second porous sublayers 351-358 to form a bottom porous DBR and layered structure 300 as shown in FIG. 3.

As shown in FIG. 10, manufacturing diagram 1000 is configured to form layered structure 400 shown in FIG. 4. In step 1010, substrate 410 is selected from a single material (e.g., bulk material). In step 1020, bottom contact 434 is formed (e.g., doped n++) as part of cavity 430 (intracavity) or atop substrate 410 (intracavity) as a separate external conductive contact. In step 1030, cavity 430 is formed (e.g., deposited) atop substrate 410 and bottom contact 434, and top contact 436 is formed (e.g., doped p++) within cavity 430 (intracavity) or atop cavity 430 (intracavity) as a separate external conductive contact. In step 1040, second DBR layer 440 is formed (e.g., deposited) with a single material atop cavity 330. In step 1050, substrate 410 is thinned to form first DBR layer 420. In some aspects, step 1050 can be omitted and substrate 410 can be porosified without being thinned. In some aspects, substrate 410 can be thinned by etching, polishing, grinding, CMP, or other suitable material reducing process. In step 1060, second DBR layer 440 and first DBR layer 420 are porosified (e.g., with porosification system 700 shown in FIG. 7) to form porous region 450 with alternating first and second porous sublayers 451-458 to form a top porous DBR and porous region 460 with alternating first and second porous sublayers 461-468 to form a bottom porous DBR, respectively, to form layered structure 400 as shown in FIG. 4.

Figure 11:
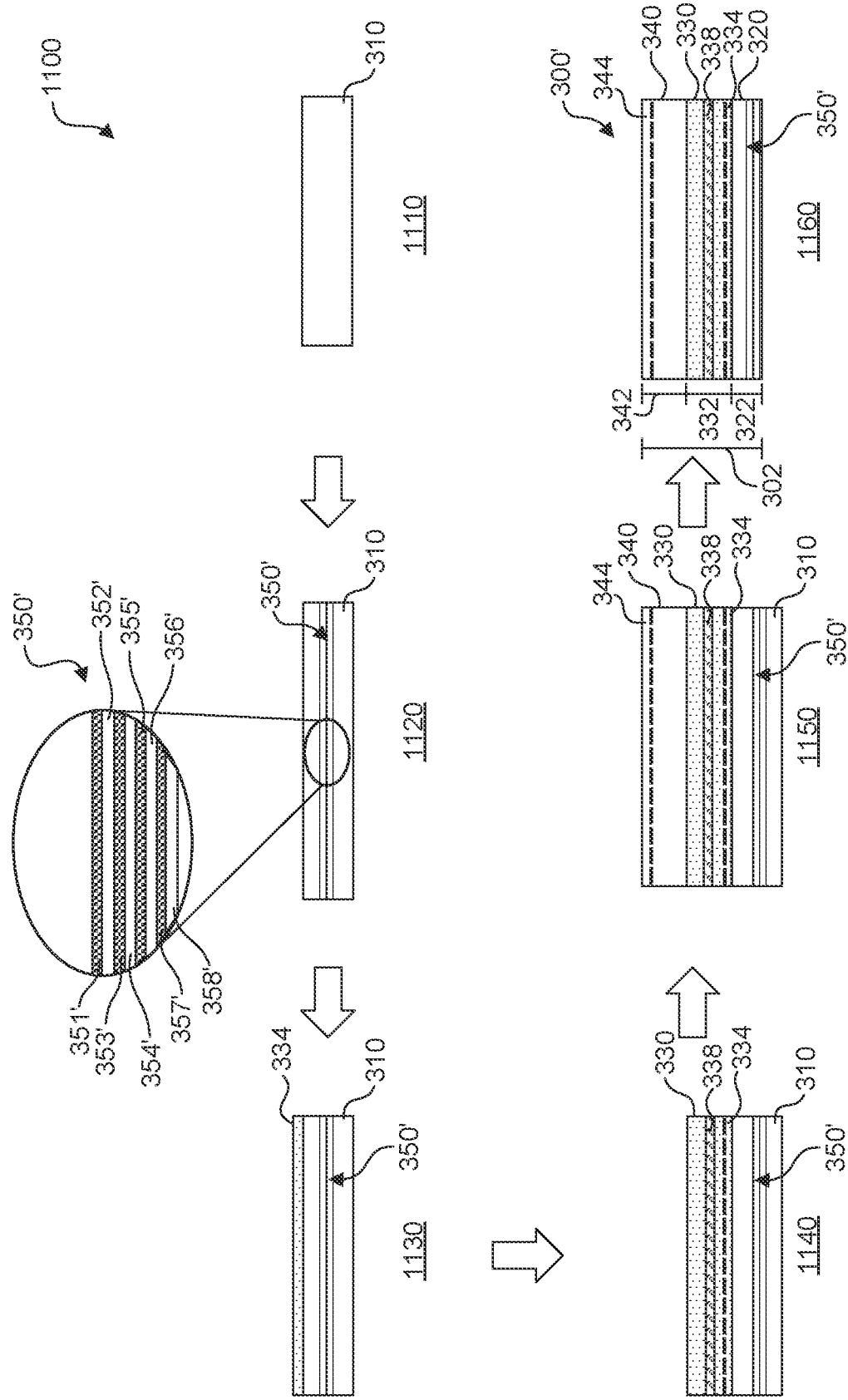
FIG. 11 is an alternative schematic manufacturing diagram for forming the layered structure shown in FIG. 3, according to an exemplary aspect.

As shown in FIG. 11, manufacturing diagram 1100 is configured to form layered structure 300', similar to layered structure 300 shown in FIG. 3. In step 1110, substrate 310 is selected from a single material (e.g., bulk material). In step 1120, substrate 310 is porosified (e.g., with porosification system 700 shown in FIG. 7) to form porous region 350' with alternating first and second porous sublayers 351'-358' to form a bottom porous DBR. In some aspects, porous region 350' can be formed approximately to a middle or midpoint depth of substrate 310. In some aspects, for example, porous region 350' can be formed by edge porosification wherein an edge portion of substrate 310 is exposed (e.g., fabrication mask, e.g., silicon nitride) and porosified laterally through the edge portion of substrate 310. In some aspects, for example, porous region 350' can be formed by applying a low current acid etch for a period of time until the acid etch reaches a middle of midpoint depth of substrate 310, at which point porosification of substrate 310 can begin with a high current acid etch.

In step 1130, bottom contact 334 is formed (e.g., doped n++) as part of cavity 330 (intracavity) or atop substrate 310 (intracavity) as a separate external conductive contact. In step 1140, cavity 330 is formed (e.g., deposited) atop substrate 310 and bottom contact 334. In step 1150, second DBR layer 340 is formed (e.g., deposited) atop cavity 330. In step 1160, substrate 310 (e.g., first DBR layer 320) is thinned to form a bottom porous DBR and layered structure 300'. In some aspects, step 1160 can be omitted and substrate 310 can be porosified without being thinned.

The aspects of layered structure 300 shown in FIG. 3, for example, and the aspects of layered structure 300' shown in FIG. 11 may be similar. Similar reference numbers are used to indicate features of the aspects of layered structure 300 shown in FIG. 3 and the similar features of the aspects of layered structure 300' shown in FIG. 11.

As shown in FIG. 12, manufacturing diagram 1200 is configured to form layered structure 600 shown in FIG. 6. In step 1210, substrate 610 is selected from a single material (e.g., bulk material). In step 1220, bottom contact 634 is formed (e.g., doped n++) as part of cavity 630 (intracavity) or atop substrate 610 (intracavity) as a separate external conductive contact. In step 1230, cavity 630 is formed (e.g., deposited) atop substrate 610 and bottom contact 634. In step 1240, top contact 636 is formed (e.g., doped p++) within cavity 630 (intracavity) or atop cavity 630 (intracavity) as a separate external conductive contact. In step 1250, substrate 610 is thinned. In some aspects, step 1250 can be omitted and substrate 610 can be porosified without being thinned. In some aspects, substrate 610 can be thinned by etching, polishing, grinding, chemical-mechanical polishing CMP, or other suitable material reducing process. In step 1260, thinned substrate 610 (e.g., DBR layer 620) is porosified (e.g., with porosification system 700 shown in FIG. 7) to form porous region 650 with alternating first and second porous sublayers 651-658 to form a bottom porous DBR and layered structure 600 as shown in FIG. 6.

Exemplary Flow Diagrams

FIGS. 13-17 illustrate flow diagrams 1300, 1400, 1500, 1600, 1700 to describe the process of forming layered structures 200, 300, 300', 400, 400', 600, according to various exemplary aspects. It is to be appreciated that not all steps in FIGS. 13-17 are needed to perform the disclosure provided herein. Further, some of the steps can be performed simultaneously, sequentially, and/or in a different order than shown in FIGS. 13-17. Flow diagrams 1300, 1400, 1500, 1600, 1700 shall be described with reference to FIGS. 1-12. However, flow diagrams 1300, 1400, 1500, 1600, 1700 are not limited to those example aspects.

Figure 13:
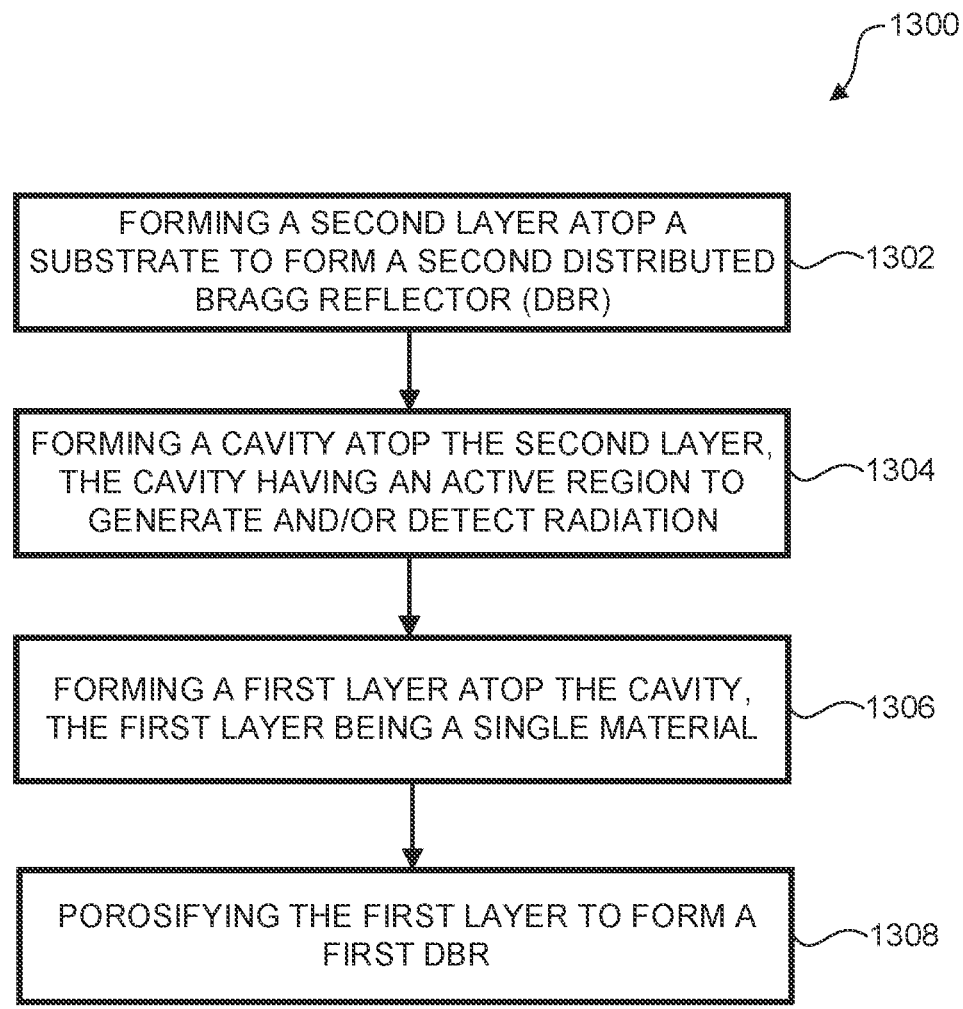
FIG. 13 is a flow diagram for forming the layered structure shown in FIG. 2, according to an exemplary aspect.

As shown in FIG. 13, flow diagram 1300 describes the process to form layered structure 200 shown in FIGS. 2 and 8. In step 1302, as shown in the example of FIGS. 2 and 8, second DBR layer 220 is formed (e.g. deposited) atop substrate 210 to form a bottom DBR. In step 1304, cavity 230 is formed (e.g., deposited) atop second DBR layer 220 with active region 238 to generate and/or detect radiation. In step 1306, first DBR layer 240 being a single material is formed (e.g., deposited) atop cavity 230. In step 1308, first DBR layer 240 is porosified to form a top DBR. In some aspects, first DBR layer 240 is porosified at a porosification rate of about 0.1 µm/min to about 10 µm/min. In some aspects, first DBR layer 240 is manufactured in a time of about two minutes to about five minutes. For example, first DBR layer 240 manufacturing is faster, high quality (e.g., R 90%), more efficient, and reduces induced strain and/or defects in layered structure 200.

Figure 14:
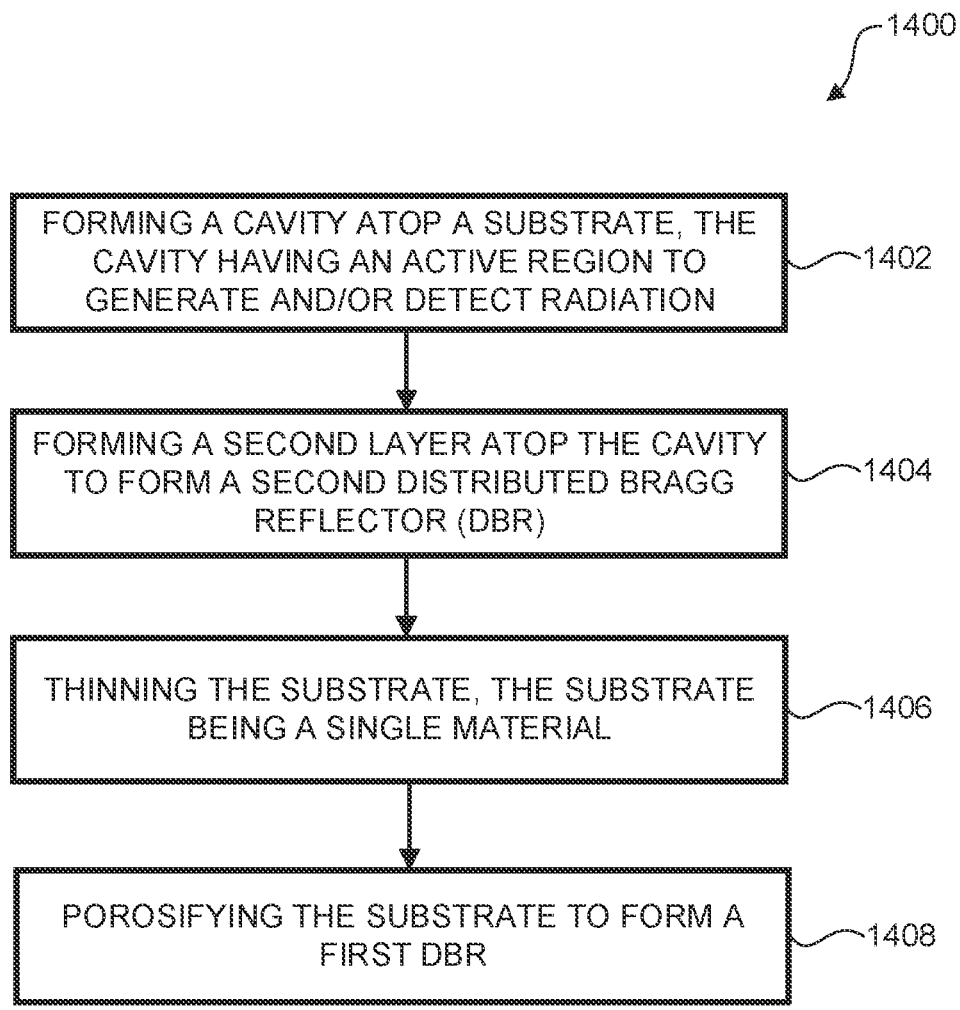
FIG. 14 is a flow diagram for forming the layered structure shown in FIG. 3, according to an exemplary aspect.

As shown in FIG. 14, flow diagram 1400 describes the process to form layered structure 300 shown in FIGS. 3 and 9. In step 1402, as shown in the example of FIGS. 3 and 9, cavity 330 is formed (e.g., deposited) atop substrate 310 with active region 338 to generate and/or detect radiation. In step 1404, second DBR layer 340 is formed (e.g. deposited) atop cavity 330 to form a top DBR. In step 1406, substrate 310 is thinned (e.g., first DBR layer 320), substrate 310 being a single material (e.g., bulk material). In some aspects, step 1406 can be omitted and substrate 310 can be porosified without being thinned. In step 1408, first DBR layer 320 is porosified to form a bottom DBR. In some aspects, first DBR layer 320 is porosified at a porosification rate of about 0.1 µm/min to about 10 µm/min. In some aspects, first DBR layer 320 is manufactured in a time of about two minutes to about five minutes. For example, first DBR layer 320 manufacturing is faster, high quality (e.g., R 90%), more efficient, and reduces induced strain and/or defects in layered structure 300.

Figure 15:
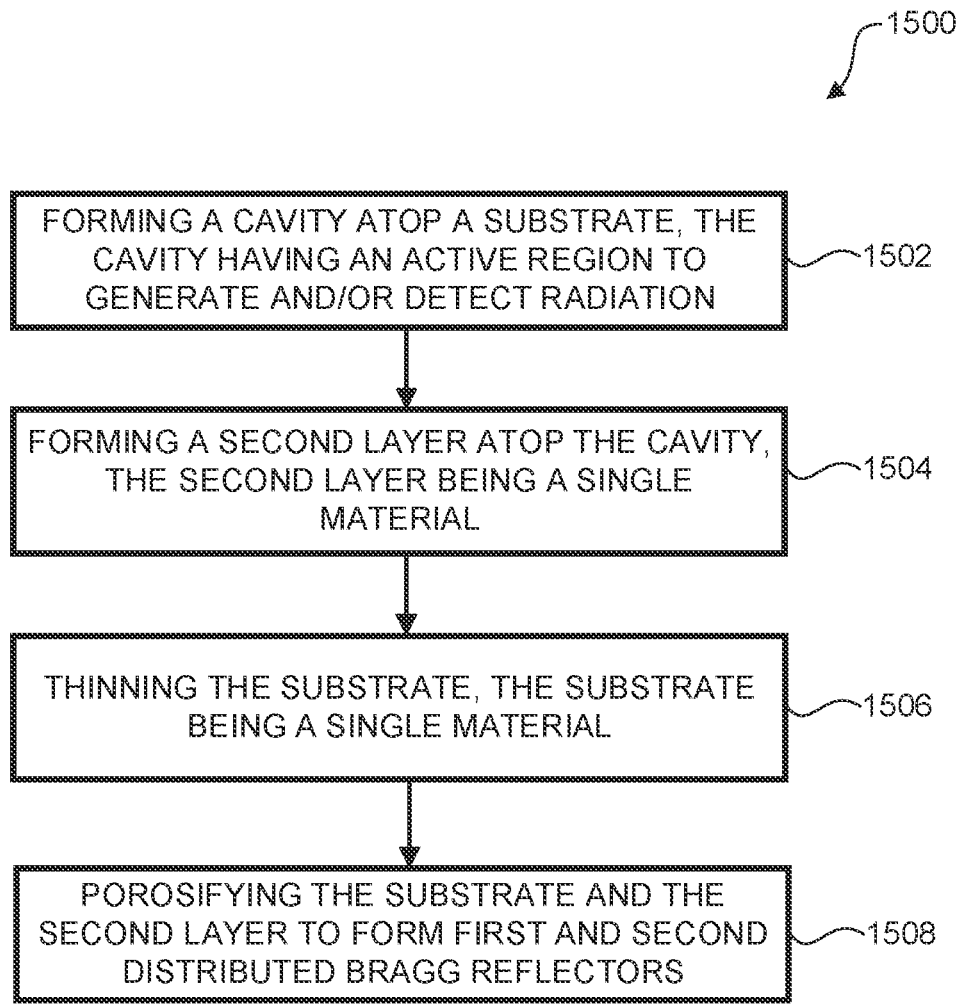
FIG. 15 is a flow diagram for forming the layered structure shown in FIG. 4, according to an exemplary aspect.

As shown in FIG. 15, flow diagram 1500 describes the process to form layered structure 400 shown in FIGS. 4 and 10. In step 1502, as shown in the example of FIGS. 4 and 10, cavity 430 is formed (e.g., deposited) atop substrate 410 with active region 438 to generate and/or detect radiation. In step 1504, second DBR layer 440 being a single material is formed (e.g., deposited) atop cavity 430. In step 1506, substrate 410 is thinned (e.g., first DBR layer 420), substrate 410 being a single material (e.g., bulk material). In some aspects, step 1506 can be omitted and substrate 410 can be porosified without being thinned. In step 1508, second DBR layer 440 and first DBR layer 420 are porosified to form a top DBR and a bottom DBR, respectively. In some aspects, second DBR layer 440 and/or first DBR layer 420 is porosified at a porosification rate of about 0.1 µm/min to about 10 µm/min. In some aspects, second DBR layer 440 and/or first DBR layer 420 is manufactured in a time of about two minutes to about five minutes. For example, second DBR layer 440 and/or first DBR layer 420 manufacturing is faster, high quality (e.g., R 90%), more efficient, and reduces induced strain and/or defects in layered structure 400.

Figure 16:
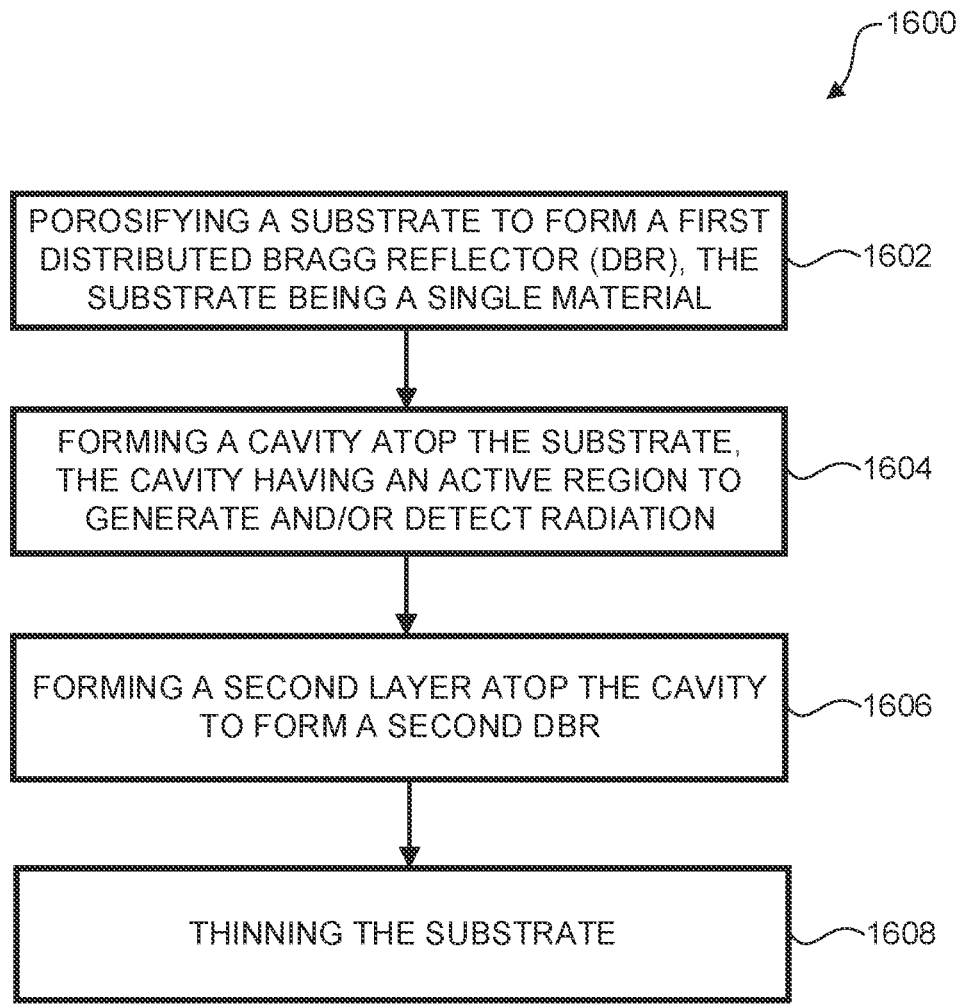
FIG. 16 is an alternative flow diagram for forming the layered structure shown in FIG. 3, according to an exemplary aspect.

As shown in FIG. 16, flow diagram 1600 describes the process to form layered structure 300' shown in FIG. 11, similar to layered structure 300 shown in FIGS. 3 and 9. In step 1602, as shown in the example of FIGS. 3, 9, and 11, substrate 310 being a single material (e.g., bulk material) is porosified to form a bottom DBR (e.g., first DBR layer 320). In step 1604, cavity 330 is formed (e.g., deposited) atop substrate 310 with active region 338 to generate and/or detect radiation. In step 1606, second DBR layer 340 is formed (e.g. deposited) atop cavity 330 to form a top DBR. In step 1608, substrate 310 is thinned (e.g., first DBR layer 320). In some aspects, step 1608 can be omitted and substrate 310 can be porosified without being thinned. In some aspects, substrate 301 (e.g., first DBR layer 320) is porosified at a porosification rate of about 0.1 μm/min to about 10 μm/min. In some aspects, first DBR layer 320 is manufactured in a time of about two minutes to about five minutes. For example, first DBR layer 320 manufacturing is faster, high quality (e.g., R 90%), more efficient, and reduces induced strain and/or defects in layered structure 300'.

Figure 17:
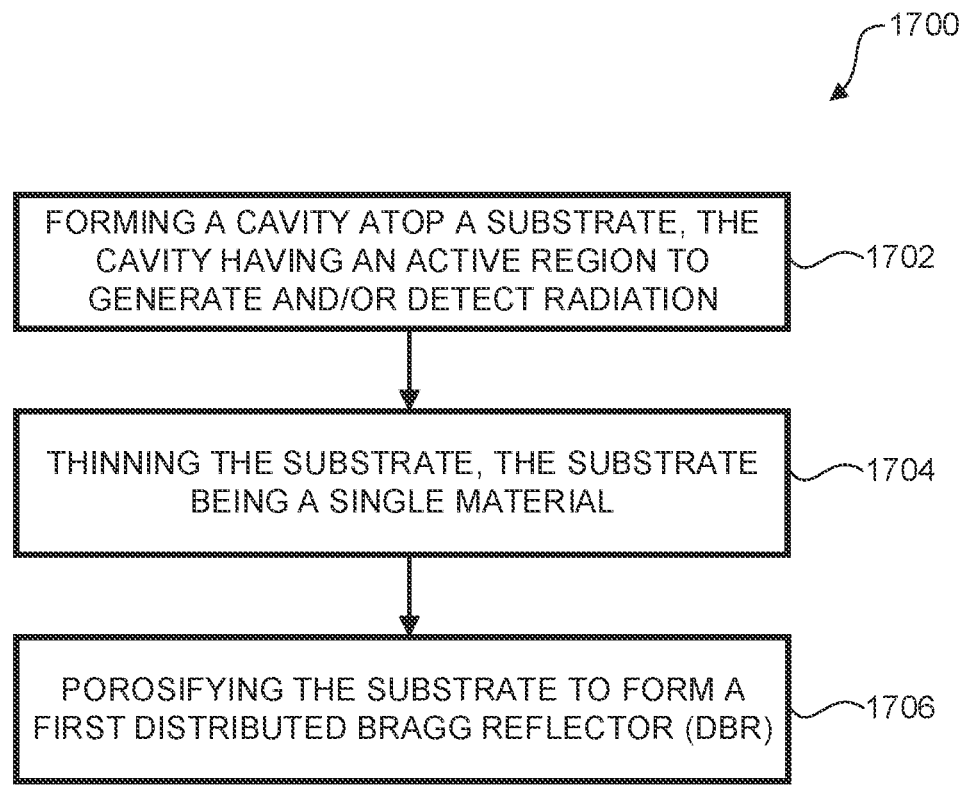
FIG. 17 is a flow diagram for forming the layered structure shown in FIG. 6, according to an exemplary aspect.

As shown in FIG. 17, flow diagram 1700 describes the process to form layered structure 600 shown in FIGS. 6 and 12. In step 1702, as shown in the example of FIGS. 6 and 12, cavity 630 is formed (e.g., deposited) atop substrate 610 with active region 638 to generate and/or detect radiation. In step 1704, substrate 610 is thinned (e.g., DBR layer 620), substrate 610 being a single material (e.g., bulk material). In some aspects, step 1704 can be omitted and substrate 610 can be porosified without being thinned. In step 1706, DBR layer 620 is porosified to form a bottom DBR. In some aspects, DBR layer 620 is porosified at a porosification rate of about 0.1 μm/min to about 10 μm/min. In some aspects, DBR layer 620 is manufactured in a time of about two minutes to about five minutes. For example, DBR layer 620 manufacturing is faster, high quality (e.g., R 90%), more efficient, and reduces induced strain and/or defects in layered structure 600.

It is to be understood that the phraseology or terminology herein is for the purpose of description and not of limitation, such that the terminology or phraseology of the present specification is to be interpreted by those skilled in relevant art(s) in light of the teachings herein.

The following examples are illustrative, but not limiting, of the aspects of this disclosure. Other suitable modifications and adaptations of the variety of conditions and parameters normally encountered in the field, and which would be apparent to those skilled in the relevant art(s), are within the spirit and scope of the disclosure.

While specific aspects have been described above, it will be appreciated that the aspects can be practiced otherwise than as described. The description is not intended to limit the scope of the claims.

The aspects have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the aspects that others can, by applying knowledge within the skill of the art, readily modify and/or adapt for various applications such specific aspects, without undue experimentation, without departing from the general concept of the aspects. Therefore, such adaptations and modifications are intended to be within the meaning and range of equivalents of the disclosed aspects, based on the teaching and guidance presented herein.

The breadth and scope of the aspects should not be limited by any of the above-described exemplary aspects, but should be defined only in accordance with the following claims and their equivalents.

What is claimed is:

1. A method of forming a layered structure, the method comprising:
    forming a layer over a monolithic substrate, the monolithic substrate being a single material, wherein the layer is coupled to the monolithic substrate, the layer comprising an active region to generate radiation or detect radiation; and thereafter
    porosifying the monolithic substrate to form a porous region to form a first distributed Bragg reflector (DBR), the porous region comprising alternating first porous and second porous sublayers of the single material to form the first DBR,
    wherein the alternating first porous and second porous sublayers have different porosities.

2. The method of claim 1, wherein the porosifying the monolithic substrate comprises a porosification rate of at least 0.1 μm/min.

3. The method of claim 2, wherein the porosification rate is at least 1 μm/min.

4. The method of claim 1, further comprising forming a second layer forming a second DBR, wherein the monolithic substrate contacts a first side of the layer and the second layer contacts a second side of the layer.

5. The method of claim 4, wherein the second layer is a second single material, and
    further comprising porosifying the second layer to form a second porous region to form the second DBR, the second porous region comprising alternating first porous and second porous sublayers of the second single material to form the second DBR.

6. The method of claim 4, wherein the second layer has substantially no lattice mismatch.

7. The method of claim 5, wherein a lattice mismatch between the alternating first porous and second porous sublayers of the second layer is less than 0.1%.

8. The method of claim 1, further comprising forming one or more embedded contacts within the layer to apply current to the active region.

9. The method of claim 1, wherein the monolithic substrate has substantially no lattice mismatch.

10. The method of claim 1, wherein a lattice mismatch between the alternating first porous and second porous sublayers is less than 0.1%.

11. The method of claim 1, wherein the alternating first porous and second porous sublayers comprise alternating porous and low porosity sublayers.

12. The method of claim 1, wherein the single material of the monolithic substrate is a dielectric.

13. The method of claim 1, wherein the single material of the monolithic substrate is silicon (Si), germanium (Ge), silicon-germanium (SiGe), gallium arsenide (GaAs), gallium nitride (GaN), gallium phosphide (GaP), gallium antimonide (GaSb), indium phosphide (InP), indium antimonide (InSb), a Group III-V semiconductor, or sapphire.

14. The method of claim 1, wherein the layered structure forms a vertical-cavity surface-emitting laser (VCSEL), a light-emitting diode (LED), a resonant cavity LED, an optical detector, a wireless receiver, a wireless transmitter, a wireless transceiver, or a combination thereof.

\* \* \* \* \*